(12) United States Patent
Kawakami

(10) Patent No.: US 6,539,178 B1
(45) Date of Patent: Mar. 25, 2003

(54) CAMERA WITH SYSTEM FOR RECORDING PHOTOGRAPHIC FACTOR ON PHOTOGRAPHED FRAME OF PHOTOGRAPHIC FILM

(75) Inventor: Sohichiroh Kawakami, Tokyo (JP)

(73) Assignee: Pentax Corporation, Tokyo (JP)

( * ) Notice: Subject to any disclaimer, the term of this patent is extended or adjusted under 35 U.S.C. 154(b) by 100 days.

(21) Appl. No.: 09/680,414

(22) Filed: Oct. 6, 2000

(30) Foreign Application Priority Data

Oct. 7, 1999 (JP) .......................................... 11-286408

(51) Int. Cl.⁷ .............................................. G03B 17/24
(52) U.S. Cl. ...................................................... 396/310
(58) Field of Search .............................. 396/310, 311, 396/104

(56) References Cited

U.S. PATENT DOCUMENTS 5,323,204 A * 6/1994 Wheeler et al. ............. 396/213
RE36,252 E * 7/1999 Kobayashi et al. ..... 340/870.24
6,058,268 A * 5/2000 Maeno ........................ 396/281
6,304,730 B1 * 10/2001 Fant et al. ................... 396/311

* cited by examiner

Primary Examiner—Russell Adams
Assistant Examiner—D. Ben Esplin
(74) Attorney, Agent, or Firm—Greenblum & Bernstein, P.L.C.

(57) ABSTRACT

In a camera, a setting system sets a photographic factor representing a proper exposure, and a measurement system measures an actual photographic factor, corresponding to the set factor during a photographing operation. A determination system determines whether there is a coincidence between the set factor and the actual factor, and a recording system records the actual factor on a photographed frame of a photographic film when the determination system determines that there is the coincidence between the set factor and the actual factor. The recording system is constituted such that an error message is recorded on the frame of the film when it is determined that there is a non-coincidence between the set factor and the actual factor.

7 Claims, 19 Drawing Sheets

FIG. 16

TABLE I

| n/c | 0 | 1 | 2 | 3 | 4 | 5 | 6 | 7 | 8 | 9 | 10 | 11 | 12 | 13 | 14 | 15 | 16 | 17 | 18 | 19 | 20 |
|-----|---|---|---|---|---|---|---|---|---|---|----|----|----|----|----|----|----|----|----|----|----|
| cha.| 0 | 1 | 2 | 3 | 4 | 5 | 6 | 7 | 8 | 9 | F  | .  | /  | +  | −  | ± | E  | >  | "  |    | r  |

FIG. 17

TABLE II

| Fno | AvNo | Av | (AvD) | Av ITEM | | | | | Av-CHARACTER DATA | | | | |
|---|---|---|---|---|---|---|---|---|---|---|---|---|---|
| 45 | 10 | 19 4/8 | 9C | F | 4 | 5 | | | 10 | 4 | 5 | 19 | 19 |
| 32 | 9 | 18 4/8 | 94 | F | 3 | 2 | | | 10 | 3 | 2 | 19 | 19 |
| 22 | 8 | 17 4/8 | 8C | F | 2 | 2 | | | 10 | 2 | 2 | 19 | 19 |
| 16 | 7 | 16 4/8 | 84 | F | 1 | 6 | | | 10 | 1 | 6 | 19 | 19 |
| 11 | 6 | 15 4/8 | 7C | F | 1 | 1 | | | 10 | 1 | 1 | 19 | 19 |
| 8.0 | 5 | 14 4/8 | 74 | F | 8 | | 6 | | 10 | 8 | 19 | 5 | 19 |
| 5.6 | 4 | 13 4/8 | 6C | F | 5 | | | | 10 | 5 | 11 | 19 | 19 |
| 4.0 | 3 | 12 4/8 | 64 | F | 4 | | 8 | | 10 | 4 | 19 | 19 | 19 |
| 2.8 | 2 | 11 4/8 | 5C | F | 2 | | | | 10 | 2 | 11 | 8 | 19 |
| 2.0 | 1 | 10 4/8 | 54 | F | 2 | | | | 10 | 2 | 19 | 19 | 19 |
| 1.4 | 0 | 9 4/8 | 4C | F | 1 | | 4 | | 10 | 1 | 11 | 4 | 19 |
| Err | | | | | E | r | r | | 19 | 16 | 20 | 20 | 19 |

FIG. 18

TABLE III

| S/S (1/sec) | TvNo | Tv | (TvD) | Tv ITEM | | | | | | Tv-CHARACTER DATA | | | | | |
|---|---|---|---|---|---|---|---|---|---|---|---|---|---|---|---|
| 1000 | 10 | 18 4/8 | 94 | | | | 0 | 0 | 0 | 1 | 1 | 1 | 0 | 0 | 0 |
| 500 | 9 | 17 4/8 | 8C | | | 1 | 5 | 0 | | 1 | 12 | 5 | 0 | 0 | 19 |
| 250 | 8 | 16 4/8 | 84 | | | 5 | 2 | 0 | | 1 | 12 | 2 | 6 | 0 | 19 |
| 125 | 7 | 15 4/8 | 7C | | | 2 | 6 | 5 | | 1 | 12 | 1 | 2 | 5 | 19 |
| 50 | 6 | 14 4/8 | 74 | 1 | \ | 1 | 3 | 0 | | 19 | 1 | 12 | 6 | 0 | 19 |
| 30 | 5 | 13 4/8 | 6C | 1 | \ | \ | 1 | 0 | | 19 | 1 | 12 | 3 | 0 | 19 |
| 15 | 4 | 12 4/8 | 64 | 1 | \ | \ | \ | 5 | | 19 | 1 | 12 | 1 | 5 | 19 |
| 8 | 3 | 11 4/8 | 5C | 1 | \ | 1 | \ | 8 | | 19 | 19 | 1 | 12 | 8 | 19 |
| 4 | 2 | 10 4/8 | 54 | | 1 | 1 | \ | 4 | | 19 | 19 | 1 | 12 | 4 | 19 |
| 2 | 1 | 9 4/8 | 4C | | 1 | 1 | \ | 2 | | 19 | 19 | 19 | 1 | 2 | 19 |
| 1" | 0 | 8 4/8 | 44 | | 1 | | 1 | = | | 19 | 19 | 19 | 2 | 18 | 19 |
| 2" | -1 | 7 4/8 | 3C | | | | 2 | = | | 19 | 19 | 19 | 2 | 18 | 19 |
| 4" | -2 | 6 4/8 | 34 | | | | 4 | = | | 19 | 19 | 19 | 4 | 18 | 19 |
| Err | | | | | | E | r | r | | 19 | 19 | 16 | 20 | 20 | 19 |

CAMERA WITH SYSTEM FOR RECORDING PHOTOGRAPHIC FACTOR ON PHOTOGRAPHED FRAME OF PHOTOGRAPHIC FILM

BACKGROUND OF THE INVENTION

1. Field of the Invention

The present invention relates to a camera which is constituted such that a photographic factor, such as a stop value, a shutter speed value and so on, can be recorded on a photographed frame.

2. Description of the Related Art

As is well known, in such a camera, when an automatic exposure mode is selected, brightness value data is detected from an object to be photographed using a photometry system incorporated in the camera. The photographic factor is calculated on the basis of the detected brightness value data, and is set as an optimum exposure factor. For example, when the optimum exposure factor is an optimum shutter speed, the shutter mechanism of the camera is operated in accordance with the optimum shutter speed during a photographing operation. Also, when the optimum exposure factor is a stop value, the diaphragm of the camera is operated by a diaphragm actuating mechanism in accordance with the optimum stop value during the photographing operation.

Occasionally, there may be a non-coincidence between the calculated optimum shutter speed value and the actual shutter speed value obtained by the operation of the shutter mechanism, due to, for example, a malfunction of the shutter mechanism. Similarly, there may be a non-coincidence between the calculated stop value and the actual stop value obtained by the operation of the diaphragm actuating mechanism, due to, for example, a malfunction of the diaphragm actuating mechanism.

In either case, the photographing operation cannot be performed with a proper exposure, and a photographer cannot determine whether the improper exposure is derived from the malfunction of the shutter mechanism or the diaphragm actuating mechanism, after the photographed film is developed.

SUMMARY OF THE INVENTION

Therefore, an object of the present invention is to provide a camera constituted such that a photographer can determine whether an improper-exposure occurrence is derived from a malfunction of a shutter mechanism or a diaphragm actuating mechanism, after development of a photographed film.

In a camera according to an aspect of the present invention, a setting system is provided for setting photographic factor data representing a proper exposure. During a photographing operation, measurement system measures actual photographic factor data, corresponding to the set photographic factor data. A determination system determines whether there is a coincidence between the set photographic factor data and the actual photographic factor data, and a recording system records the actual photographic factor data on a photographed frame of a photographic film when it is determined by the determination system that there is the coincidence between the set photographic factor data and the actual photographic factor data. The recording system is constituted such that an error message data is recorded on the photographed frame of the photographic film when it is determined by the determination system that there is a non-coincidence between the set photographic factor data and the actual photographic factor data.

Preferably, the recording system is further constituted such that the error message data is recorded on the photographed frame of the photographic film as a substitute for the actual photographic factor data when it is determined by the determination system that there is the non-coincidence between the set photographic factor data and the actual photographic factor data.

The camera may further comprise a winding system that winds the photographic film on from a film cartridge by a length corresponding to one frame after the photographing operation, and a memory system that stores the set photographic factor data, the actual photographic factor data. The memory system also stores the error message data when it is determined by the determination system there is the non-coincidence between the set photographic factor data and the actual photographic data. In this case, the recording system is constituted such that the error message data is read from the memory system, and is recorded on the photographed frame of the photographic film during the winding of the one frame length of the photographic film by the winding system, when it is determined by the determination system there is the non-coincidence between the set photographic factor data and the actual photographic data.

When the photographic factor data is a stop value data, the setting system is provided to set a proper stop value data, and the measurement system is provided to measure an actual stop value data during the photographing operation. On the other hand, when the photographic factor data is a shutter speed value data, the setting system is provided to set a proper shutter speed value data, and the measurement system is provided to measure an actual shutter speed value data during the photographing operation.

Preferably, in the setting system, an exposure mode selection system is provided for selecting one of an automatic exposure mode and a manual exposure mode, and a photometry system is provided for detecting a brightness value data from an object to be photographed. When the automatic exposure mode is selected by the exposure mode selection system, a photographic factor calculation system calculates the photographic factor data representing the proper exposure from the brightness value data detected by the photometry system. When the manual exposure mode is selected by the exposure mode selection system, a manual setting system manually sets the photographic factor data representing the proper exposure.

In a camera according to another aspect of the present invention, a first setting system is provided for setting first photographic factor data representing a proper exposure, and a second setting system is provided for setting second photographic factor data representing the proper exposure. During a photographing operation, a first measurement system measures first actual photographic factor data, corresponding to the set first photographic factor data, and a second measurement system measures second actual photographic factor data, corresponding to the set second photographic factor data. A first determination system determines whether there is a coincidence between the set first photographic factor data and the first actual photographic factor data, and a second determination system determines whether there is a coincidence between the set second photographic factor data and the second actual photographic factor data. A recording system records the first actual photographic factor data and the second actual photographic factor data on a photographed frame of a photographic film, when it is determined by the first determination system that there is the coincidence between the set first photographic factor data and the first actual photographic factor data, and when it is determined by the second determination system that there is the coincidence between the set second photographic factor data and the second actual photographic factor data.

In the camera according to the other aspect of the present invention, the recording system is constituted such that a first error message data is recorded on the photographed frame of the photographic film as a substitute for the first actual photographic factor data when it is determined by the first determination system that there is a non-coincidence between the set first photographic factor data and the first actual photographic factor data, and such that a second error message data is recorded on the photographed frame of the photographic film as a substitute for the second actual photographic factor data when it is determined by the second determination system that there is a non-coincidence between the set second photographic factor data and the second actual photographic factor data, thereby determining whether an improper-exposure occurrence is derived from the non-coincidence between the set first photographic factor data and the first actual photographic factor data or the non-coincidence between the set second photographic factor data and the second actual photographic factor data.

BRIEF DESCRIPTION OF THE DRAWINGS

The object and other objects of the present invention will be better understood from the following descriptions, with reference to the accompanying drawings, in which:

FIG. 16 is a table showing relationships between numerical components (n/c) to be set in a recording-format and characters to be recorded by the recording-format;

FIG. 17 is a table showing relationships between stop value data and numerical data associated therewith;

FIG. 18 is a table showing relationships between shutter speed data and numerical data associated therewith.

DESCRIPTION OF THE PREFERRED EMBODIMENTS

Figure 1:
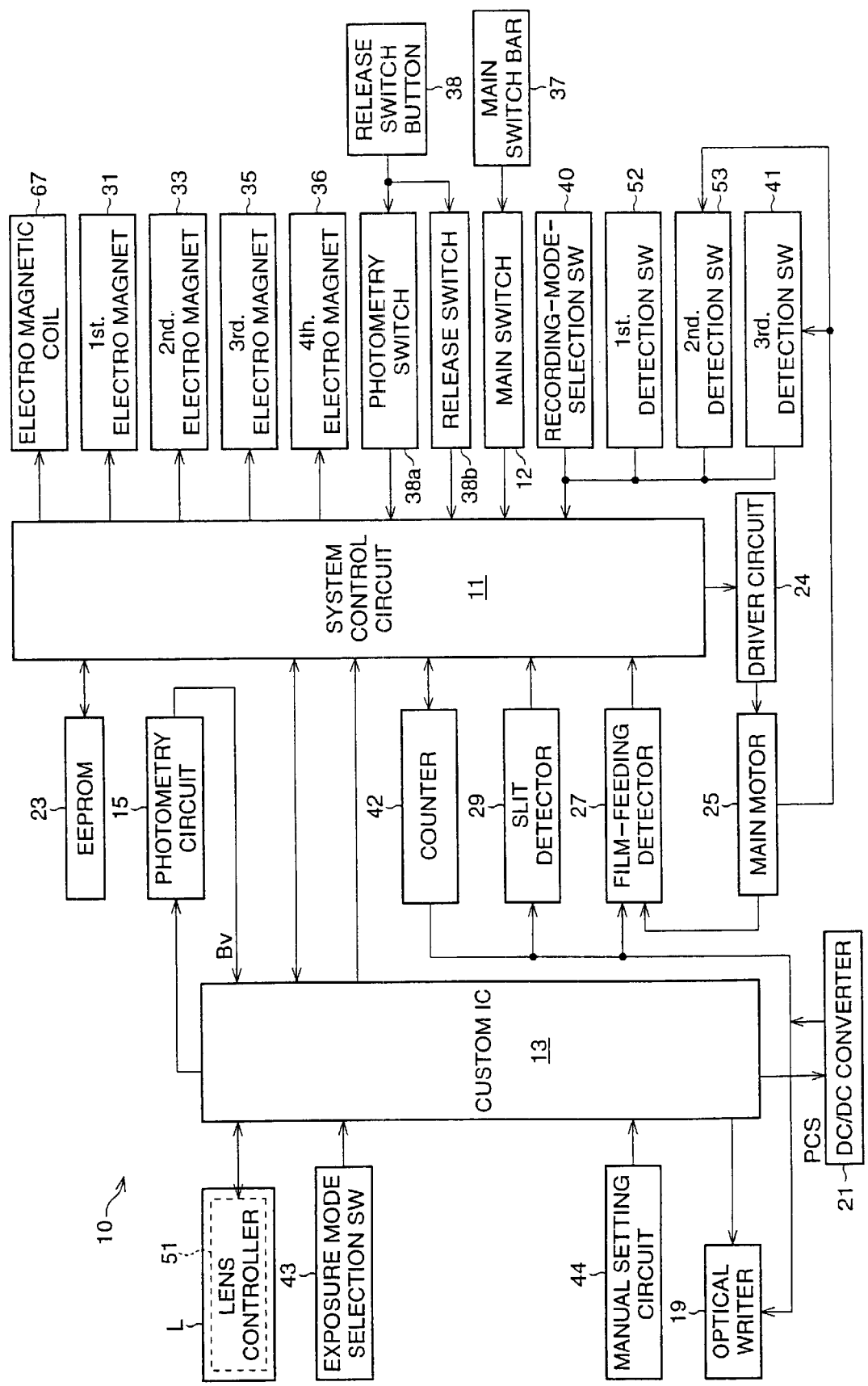
FIG. 1 is a schematic block diagram of a single lens reflex (SLR) type camera according to the present invention.

With reference to FIG. 1, a single lens reflex (SLR) type camera, generally indicated by reference 10, is schematically shown as a block diagram, and is constituted according to the present invention. The SLR camera 10 is provided with a system control circuit 11, which may be constituted as a microcomputer comprising a central processing unit (CPU), a read-only memory (ROM) for storing programs and constants, a random-access memory (RAM) for storing temporary data, and an input/output interface circuit (I/O). The system control circuit 11 is connected to a custom integrated circuit (IC) 13 via a signal bus and a data bus to control the SLR camera 10 as a whole.

The SLR camera 10 has a slidable main switch bar 37 provided at a suitable location on a camera body thereof, and the main switch bar 37 is associated with a main or power switch 12. A DC/DC converter 21 is connected to the custom IC 13, and to a suitable battery (not shown) detachably loaded in the camera body. When the main switch bar 37 is manipulated by an operator or photographer, the system control circuit 11 outputs a power control signal PCS to the DC/DC converter 21 via the custom IC 13, whereby various peripheral electronic elements of the SLR camera 10 are electrically powered from the battery via the DC/DC converter 21.

The SLR camera 10 is provided with a photographing lens system L formed as a detachable lens barrel, and the lens barrel contains a lens controller 51 constituted as a microcomputer. When the lens barrel is mounted on a lens mount of the camera body, the lens controller 51 is electrically connected to the custom IC 13. A memory in the microcomputer or lens controller 51 stores variable data, concerning the photographing lens system L, such as a focus distance, a minimum stop value, a maximum stop value, lens information data and so on, and the variable data is retrieved from the memory of the lens controller 51 by the system control circuit 11 via the custom IC 13.

The SLR camera 10 has a release switch button 38 provided at a suitable location on the camera body thereof, and the release switch button 38 is associated with both a photometry switch 38a and a release switch 38b. When the release switch button 38 is partly depressed, the photometry switch 38a is turned ON, and, when the release switch button 38 is fully depressed, the release switch 38b is turned ON.

The photometry switch 38a is associated with a photometry circuit 15, having a photometry sensor, which is connected to the custom IC 13 and operated under control of the system control circuit 11. When the photometry switch 38a is turned ON, the photometry sensor detects a quantity of light, reflected from a scene to be photographed, through the photographing lens system L, and the photometry circuit 15 produces a brightness signal $B_V$ in accordance with the detected quantity of light. The brightness signal $B_V$ is received as digital brightness value data by the custom IC 13, and the brightness value data $B_V$ is then transferred from the custom IC 13 to the system control circuit 11. Namely, the brightness value data $B_V$ represents the brightness of the scene to be photographed.

In the system control circuit 11, the detected brightness value data $B_V$ is used to determine an exposure value data $E_V$ based on an AE calculation, and then a shutter speed data $T_V$ and a stop value data $A_V$ are calculated from the exposure value data $E_V$. The calculations are performed based on the APEX (additive system of photographic exposure) system as follows:

$$T_V + A_V = B_V + S_V = E_V$$

Herein: $S_V$ is a DX code data, representing a sensitivity of the photographic film used. Note that, as is well known, the DX code data is read from bar code data of a loaded film cartridge by a DX code detector circuit (not shown).

In this embodiment, preferably, a divided brightness measurement method is utilized for the production of the brightness signal $B_V$. Namely, in the divided brightness measurement method, the scene to be photographed is divided into a plurality of areas, and the photometry circuit 15 with the photometry sensor is constituted to individually detect respective quantities of light reflected from the divided areas. When an averaged brightness measurement mode is selected, the produced brightness signal $B_V$ represents a whole brightness of the divided areas of the scene to be photographed, and, when a spot brightness measurement mode is selected, the produced brightness signal $B_V$ represents a brightness of the center area of the divided areas.

When the release switch 38b is turned ON, a photographing operation is performed. As is well known, the SLR camera 10 features a movable mirror mechanism and a focal-plane shutter mechanism for the performance of the photographing operation.

The movable mirror mechanism includes a mirror which is movable between a down-position and an up-position, and which is rotated from the down-position to the up-position by driving a main motor 25 by a driver circuit 24 in one of the two rotational directions. When the mirror is at the down-position, light beams, passing through the photographing lens system L, are reflected to a viewfinder optical system incorporated in the camera body. When the mirror is moved from the down-position to the up-position, the light beams, passing through the photographing lens system L, are directed to a plane at which a frame of the photographic film is positioned.

The focal-plane shutter mechanism includes a leading shutter curtain and a trailing shutter curtain. Each of the leading and trailing shutter curtains is movable between an initial position and an end position, and is associated with a shutter spring such that each curtain is elastically moved from the initial position toward the end position. Usually, both the shutter curtains are mechanically constrained by a shutter lock mechanism at the initial positions against the elastic force of the shutter spring. The focal-plane shutter mechanism also includes a first electromagnet 31 associated with the leading shutter curtain, a second electromagnet 33 associated with the trailing shutter curtain, and a third electromagnet 35 associated with the shutter lock mechanism.

In the photographing operation, the first and second electromagnets 31 and 33 are electrically energized such that the respective leading and trailing shutter curtains are magnetically attracted by the first and second electromagnets 31 and 33. Then, the third electromagnet 35 is electrically energized to unlock the shutter lock mechanism, thereby releasing the leading and trailing shutter curtains from the shutter lock mechanism. However, both the shutter curtains still remain at the initial positions due to the magnetic attraction to the first and second electromagnets 31 and 33.

Subsequently, the mirror lock mechanism is unlocked, thereby releasing the mirror from the mirror lock mechanism, so that the mirror is elastically moved from the down-position toward the up-position. When the mirror reaches the up-position, the first electromagnet 31 de-energized, and thus the leading shutter curtain is released. Namely, the leading shutter curtain is elastically moved from the initial position toward the end position, thereby opening the focal-plane shutter.

After a predetermined time has elapsed, the second electromagnet 33 is de-energized, and thus the trailing shutter curtain is released. Namely, the trailing shutter curtain is elastically moved from the initial position toward the end position, thereby closing the focal-plane shutter. Thus, the photographing operation is completed.

Note that, a duration of a shutter-open time is defined as a duration of time between a time at which the leading shutter curtain is started from the first position and a time at which the trailing shutter curtain is started from the first position. Also, note that, the shutter-open time corresponds to the shutter speed data $T_V$ obtained from the AE calculation.

Respective first and second detection switches 52 and 53 are provided near the end positions of the leading and trailing shutter curtains to detect whether the leading and trailing shutter curtains reach the end positions during the photographing operation. Namely, when the leading shutter curtain has reached the end position, the first detection switch 52 is changed from an OFF-state to an ON-state, and, when the trailing shutter curtain has reached the end position, the second detection switch 53 is changed from an OFF-state to an ON-state. Thus, the system control circuit 11 can confirm whether each of the leading and trailing shutter curtains has reached the end position thereof by detecting the change of the respective detections witches 52 and 53 from the OFF-state to the ON-state.

A diaphragm is incorporated in the photographing lens system L, and is used to adjust an amount of light passing through the photographing lens system L during the photographing operation. The diaphragm comprises a plurality of blades which are radially and movable arranged to enable continuously varying apertures, whereby the amount of light passing through the photographing lens system is adjustable. An aperture of the diaphragm is represented as a stop value ($A_V$). As is well known, the larger the aperture of the diaphragm, the smaller the stop value, and vice versa.

When the lens barrel, including the photographing lens system L, is mounted on the lens mount of the camera body, the diaphragm is mechanically associated with a diaphragm actuating mechanism provided in the camera body. The aperture of the diaphragm is adjusted by driving the diaphragm actuating mechanism in accordance with the stop value data $A_V$ obtained from the AE calculation.

Figure 2:
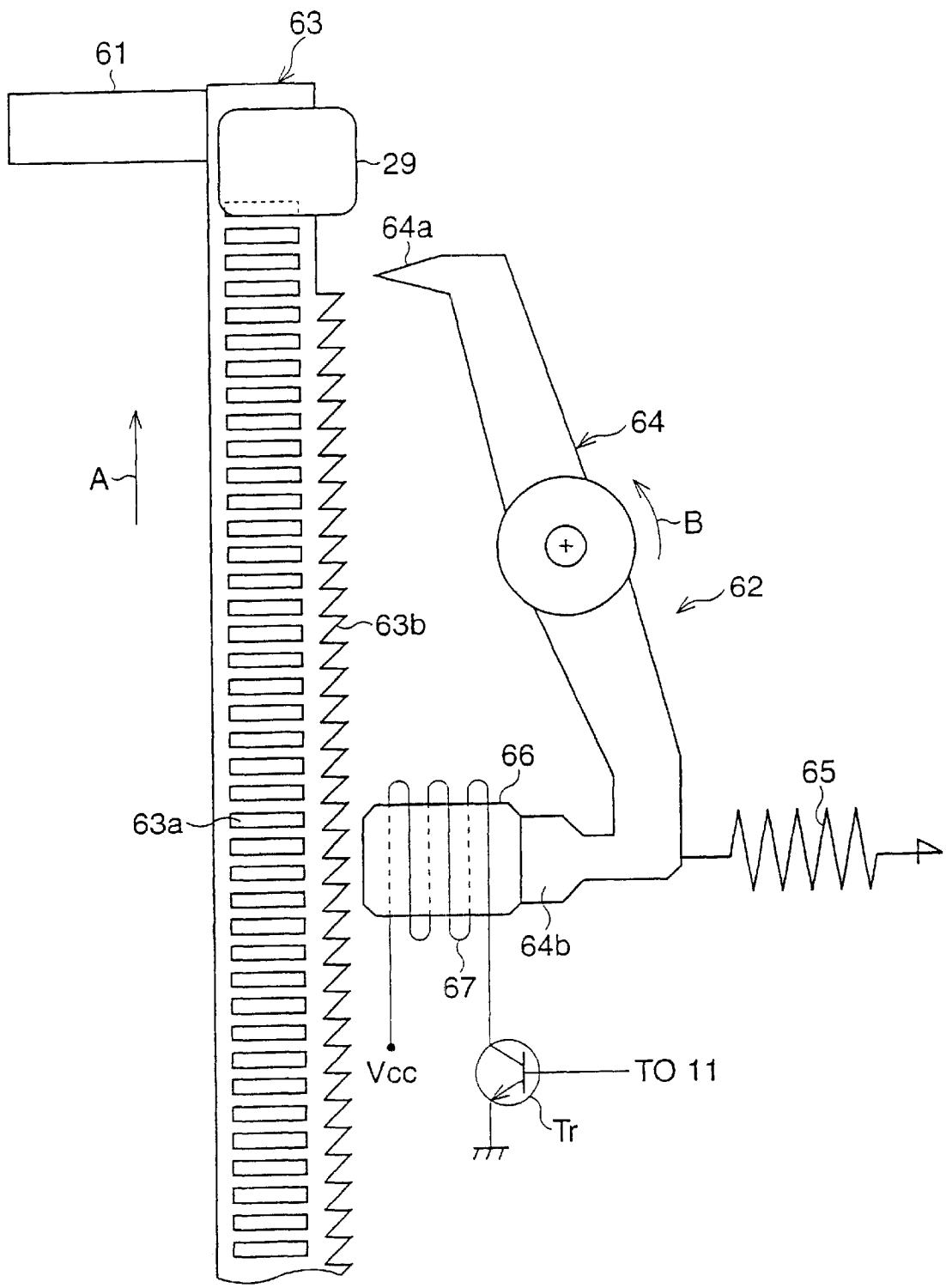
FIG. 2 is a schematic view partially showing a diaphragm actuating mechanism incorporated in the SLR camera.

Referring to FIG. 2, the diaphragm actuating mechanism is schematically shown, and includes a slidable plate element 63, which is associated with a spring (not shown) such that the slidable plate element 63 is elastically moved in a direction indicated by reference A. Usually, the plate element 63 is mechanically locked at an initial position, as shown in FIG. 2, by a plate lock mechanism (not shown). The slidable plate element 63 has an actuating lever 61 projected from a leading end thereof, and the actuating lever 61 is engaged with the diaphragm, incorporated in the photographing lens system L, when the lens barrel is mounted on the lens mount of the camera body.

During the photographing operation, the plate lock mechanism is unlocked when the mirror is moved from the down-position toward the up-position, so that the slidable plate element 63 is elastically moved from the initial position in the direction A. By moving the slidable plate element 63 in the direction A, the aperture of the diaphragm gradually becomes smaller, i.e. a stop value ($A_V$) of the diaphragm is gradually changed toward a maximum stop value. When the slidable plate element 63 is in the initial position as shown in FIG. 2, the diaphragm has a minimum stop value corresponding to a full-open aperture thereof.

In the photographing operation, when the aperture of the diaphragm reaches the stop value data $A_V$ obtained from the AE calculation, the movement of the slidable plate element 63 is halted. To this end, the slidable plate element 63 has a series of slits formed therein (one of the slits is representatively indicated by reference 63a in FIG. 2). and the slits 63a are associated with a slit detector 29, formed as a photo-interrupter, which is securely supported by a mechanical frame of the camera body. Also, the slidable plate element 63 has a series of teeth formed along a longitudinal edge thereof (one of the teeth is representatively indicated by reference 63b in FIG. 2), and the teeth 63b are associated with a latch mechanism, generally indicated by reference 62. Note that, the number of the slits 63a is equal to that of the teeth 63b, and the slits 63a and teeth 63b are correspondingly arranged with respect to each other.

During the movement of the slidable plate element 63 in the direction A, the series of slits 63a passes through the slit detector or photo-interrupter 29. Whenever the photo-interrupter 29 detects the passage of each slit 63a, it produces and outputs a pulse to the system control circuit 11 (FIG. 1). Namely, during the movement of the slidable plate element 63 in the direction A, the photo-interrupter 29 produces and outputs a series of pulses to the system control circuit 11. The respective slits 63a correspond to discrete stop values of the diaphragm. Thus, by counting the output pulses, the system control circuit 11 can confirm whether the aperture of the diaphragm has reached the aforementioned stop value data $A_V$.

As shown in FIG. 2, the latch mechanism 62 includes a two-armed lever 64 which is rotatably mounted on a pivot pin securely supported by the mechanical frame of the camera body. One arm of the two-armed lever 64 terminates with a pawl 64a, which can be engaged with one of the teeth 63b of the slidable plate element 63, and the other arm terminates with a head 64b, which is formed of a suitable magnetic material. Note that, the complete lever 64 may be formed of suitable magnetic material.

The latch mechanism 62 also includes a tensile coil spring 65 acting on the other arm of the two-armed lever 64, and a permanent magnet 66 associated with the head 64b of the two-armed lever 64. The tensile coil spring 65 is securely connected to the other arm of the two-armed lever 64 at one end thereof, and is securely connected to the mechanical frame of the camera body at the other end, so that the two-armed lever 64 is subjected to a rotary force in a direction indicated by arrow B in FIG. 2. However, usually, the two-armed lever 64 is at a stationary position as shown in FIG. 2, because the head 64b of the two-armed lever 64 is magnetically attracted to the permanent magnet 66 against the elastic force of the tensile spring 65. Thus, the pawl 64a of the two-armed lever cannot be engaged with the teeth 63b of the slidable plate element 63.

The latch mechanism 62 further includes an electromagnetic coil 67 provided around the permanent magnet 66 (FIGS. 1 and 2), and a suitable voltage $V_{cc}$ is applied from the DC/DC converter 21 (FIG. 1) to one end of the electromagnetic coil 67. As shown in FIG. 2, the electromagnetic coil 67 is provided with a switch element or transistor $T_r$. Namely, a collector of the transistor $T_r$ is connected to the other end of the electromagnetic oil 67; and an emitter of the transistor $T_r$ is grounded; and a base of the transistor $T_r$ is connected to the system control circuit 11.

Thus, when a given voltage is applied from the system control circuit 11 to the base of the transistor $T_r$, the transistor $T_r$ is turned ON, whereby the electromagnetic coil 67 is electrically energized such that the magnetic force of the permanent magnet 66 is neutralized. When the head 64b of the two-armed lever 64 is released from the magnetic attraction of the permanent magnetic 66, the two-armed lever 64 is rotated in the direction B due to the elastic force of the tensile spring 65, so that the pawl 64a of the two-armed lever 64 is engaged with one of the teeth 63b of the slidable plate element, thereby stopping the movement of the slidable plate element 63.

When it is confirmed by the system control circuit 11 that the aperture of the diaphragm is in accord with the stop value data $A_V$, a voltage is applied to the base of the transistor $T_r$, and the aperture of the diaphragm can be set to correspond to the stop value data $A_V$.

After completion of the photographing operation, the main motor 25 is driven in the direction opposite to the direction, in which the main motor 25 is driven to move the mirror from the down-position to the up-position so that the photographic film is wound on from the film cartridge by a length corresponding to one frame. To this end, a film-feeding detector 27 is provided to detect a wounded length corresponding to the one frame.

In particular, the film-feeding detector 27 is formed as a photo-interrupter associated with a film-feeding detection roller (not shown), which is engaged with a part of a film-feeding mechanism so as to be rotated by the feeding of the photographic film. During the rotation of the film-feeding detection roller, the film-feeding detector or photo-interrupter 27 produces and outputs a series of film-feeding pulses to the system control circuit 11. Of course, the number of the output film-feeding pulses represents the length of the photographic film wound on from the film cartridge. Thus, by counting the output film-feeding pulses, the system control circuit 11 can confirm whether the photographic film has been wound on from the film cartridge by one frame length. In this embodiment, the one frame length of photographic film corresponds to 24 film-feeding pulses.

Note that, during the winding of the photographic film on from the film cartridge, the focal-plane shutter mechanism and the movable mirror mechanism are returned to their initial states, using the driving force of the main motor 25 while winding the one frame length of photographic film. In particular, in the focal-plane shutter mechanism, the leading and trailing shutter curtains are returned from the end positions to the initial positions such that the shutter springs are elastically charged or tensioned, and the shutter curtains are mechanically locked at the initial positions by the shutter lock mechanism. Of course, in the movable mirror mechanism, the mirror is also returned from the up-position to the initial or down position.

Further, the diaphragm actuating mechanism (FIG. 2) is returned to the initial state, also using the driving force of the main motor 25 while winding the one frame length of photographic film. Namely, the slidable plate element 63 is moved in the opposite direction to the direction A against the elastic force of the spring (not shown), and the electromagnetic coil 67 is de-energized, thereby magnetically attracting the head 64b of the two-armed lever 64. Of course, when the slidable plate element 63 is returned to the initial position as shown in FIG. 2, it is locked by the plate lock mechanism.

Note that, each of the first and second detection switches 52 and 53 is returned from the ON-state to the OFF-state when the winding of the one frame length of photographic film has been completed.

As mentioned hereinbefore, in the system control circuit 11, the determination of the exposure value data $E_V$ is based on the detected brightness value data $B_V$, and then the stop value data $A_V$ and the shutter speed data $T_V$ are calculated from the exposure value data $E_V$. The calculated stop value data $A_V$ and the shutter speed data $T_V$ are temporarily stored in an electrically erasable programmable read-only memory (EEPROM) 23 (FIG. 1). Also, after calculation of the stop value data $A_V$ is completed, a number of pulses corresponding to the calculated stop value data $A_V$ is further calculated, and is temporarily stored as a pulse-number data in the EEPROM 23. Therefore, when the number of pulses corresponding to the calculated stop value data $A_V$ is output from the slit detector 29 during the movement of the slidable plate element 63 in the direction A, the aperture of the diaphragm has reached the calculated stop value data $A_V$.

In the photographing operation, an actual shutter-open time of the focal plane shutter mechanism is counted as stated in detail hereinafter, and it is determined whether the counted shutter-open time substantially coincides with the shutter speed data $T_V$ stored in the EEPROM 23. If there is a coincidence between the counted shutter-open time and the stored shutter speed data $T_V$, it can be confirmed that the focal plane shutter mechanism has properly operated. On the contrary, if there is a non-coincidence between the counted shutter-open time and the stored shutter speed data $T_V$, it may be confirmed that there is a malfunction in the focal plane shutter mechanism.

Also, in the photographing operation, the actual number of pulses output from the slit detector 29 is counted, and it is determined whether the counted number of pulses coincides with the pulse-number data stored in the EEPROM 23. If there is a coincidence between the counted number of pulses and the stored pulse-number data, it can be confirmed that the diaphragm actuating mechanism has properly operated. On the contrary, if there is a non-coincidence between the counted number of pulses and the stored pulse-number data, it may be confirmed that a malfunction has occurred in the diaphragm actuating mechanism.

In FIG. 1, reference 41 indicates a third detection switch incorporated in a film-latch mechanism (not shown) associated with the film-feeding mechanism. As soon as the winding of the one frame length of the photographic film is completed, the feeding of the photographic film should be halted. However, though the main motor 25 is stopped, the film-feeding action of the film-feeding mechanism cannot be immediately stopped due to inertia thereof. The film-latch mechanism is operated just after the completion of the winding of the one frame length of the photographic film, thereby latching the film-feeding mechanism to immediately halt the photographic film. The third detections witch 41 is arranged so as to be turned ON when the film-feeding mechanism is properly latched by the film-latch mechanism.

In FIG. 1, reference 43 indicates an exposure mode selection switch for selecting one of an automatic exposure (AE) mode, a manual exposure (ME) mode and a bulb mode. When the AE mode is selected, the settings of the shutter speed value ($T_V$) and stop value ($A_V$) are automatically performed in the aforementioned manner.

When the ME mode is selected, a shutter speed value ($T_V$) and a stop value ($A_V$) are manually selected and set. To this end, an manual setting circuit 44 is provided to manually set the shutter speed value ($T_V$) and the stop value ($A_V$), and includes a shutter-speed-selection rotary switch for selecting one of a plurality of shutter speed values, and a stop-value-selection rotary switch for selecting one of a plurality of stop values.

The manual setting circuit 4 is usually disabled, and is enabled when the manual exposure mode is selected by the exposure mode selection switch 43. When one of the shutter speed values is selected by manipulating the shutter-speed-selection rotary switch, the selected shutter speed value is output as a shutter speed value data $T_v$ to the custom IC 13, and is retrieved by the system control circuit 11. Also, when one of the stop values is selected by manipulating the stop-value-selection rotary switch, the selected stop value is output as a stop value data $A_V$ to the custom IC 13, and is retrieved by the system control circuit 11. Note that, the retrieved shutter speed value data $T_V$ and stop value data $A_v$ are stored in the EEPROM 23.

Reference 19 indicates an optical writer for optically recording the photographic factor data ($A_V$ and $T_V$) on a margin area of a photographed frame while winding the one frame length of photographic film. The optical writer 19 is incorporated in the camera body, and is disposed along the passage of the photographic film. The optical writer 19 comprises seven light-emitting diodes (LED), and seven light guide elements associated therewith. The light guide elements are arranged such that numerical characters alphabet letters are recorded in a 7×5 dot-matrix manner while winding the one frame length of photographic film.

The optical writer 19 is also used to record an error message on a margin area of a photographed frame when there is a non-coincidence between an actual stop value and a calculated stop value data $A_V$ or there is a non-coincidence between an actual shutter-open time and a calculated shutter speed data $T_V$.

Figure 3:
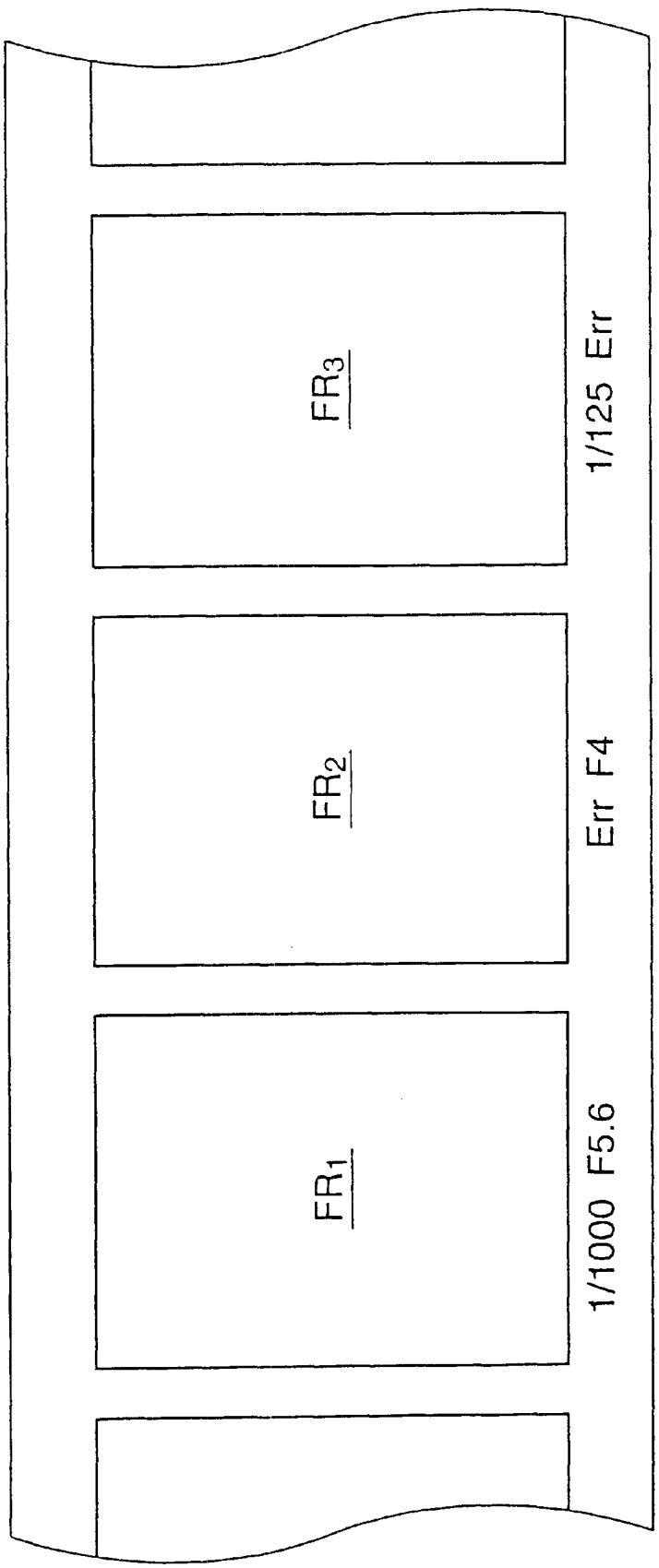
FIG. 3 is a view partially showing by way of example a developed photographic film, photographed by the camera of FIG. 1, on the margin area of which photographic factor data are optically recorded.

With reference to FIG. 3, a developed film is shown by way of example, and includes respective three frames indicated by references $FR_1$, $FR_2$, and $FR_3$. The frame $FR_1$ represents a case where a photographing operation is performed with a proper shutter speed and a proper stop value, and the respective proper shutter speed and proper stop value are recorded as photographic data ¹⁄₁₀₀₀ and F5.6 on a margin area of the frame $FR_1$. The frame $FR_2$ represents a case where a photographing operation is performed with an improper shutter speed and a proper stop value, and the respective improper shutter speed and proper stop value are recorded as photographic data Err and F4 on a margin area of the frame $FR_2$. The frame $FR_3$ represents a case where a photographing operation is performed with a proper shutter speed and an improper stop value, and the respective proper shutter speed and improper stop value are recorded as photographic data ¹⁄₁₂₅ and Err on a margin area of the frame $FR_3$.

Of course, in the frame $FR_2$, the "Err" implies that the focal plane shutter mechanism is erroneously operated, and, in the frame $FR_3$, the "Err" implies that the diaphragm actuating mechanism is erroneously operated. Therefore, a photographer can easily determine whether the improper-exposure occurrence is derived from a malfunction of the shutter mechanism or a malfunction of the diaphragm actuating mechanism after development of a photographed film.

The optical writer 19 is associated with a recording-mode-selection switch 40. When the recording-mode-selection switch 40 is in an ON-state, the optical writer 19 is enabled to perform the recording of the photographic factor data ($A_V$ and $T_V$) and the error message. On the other hand, when the recording-mode-selection switch 40 is in an OFF-state, the optical writer 19 is disabled to prohibit the recording of the photographic factor data ($A_V$ and $T_V$) and the error message.

Reference 42 indicates a timer or counter for measuring a time with a unit of 1 μs. When a time is set in the counter 42, the set time is counted and measured by the counter 42. When the measurement of the set time is completed, the counter 42 output a signal to the system control circuit 11, as confirmation to the system control circuit 11. The counter 42 is used to control the focal plane shutter mechanism during a photographing operation, as stated hereinafter.

Figure 4:
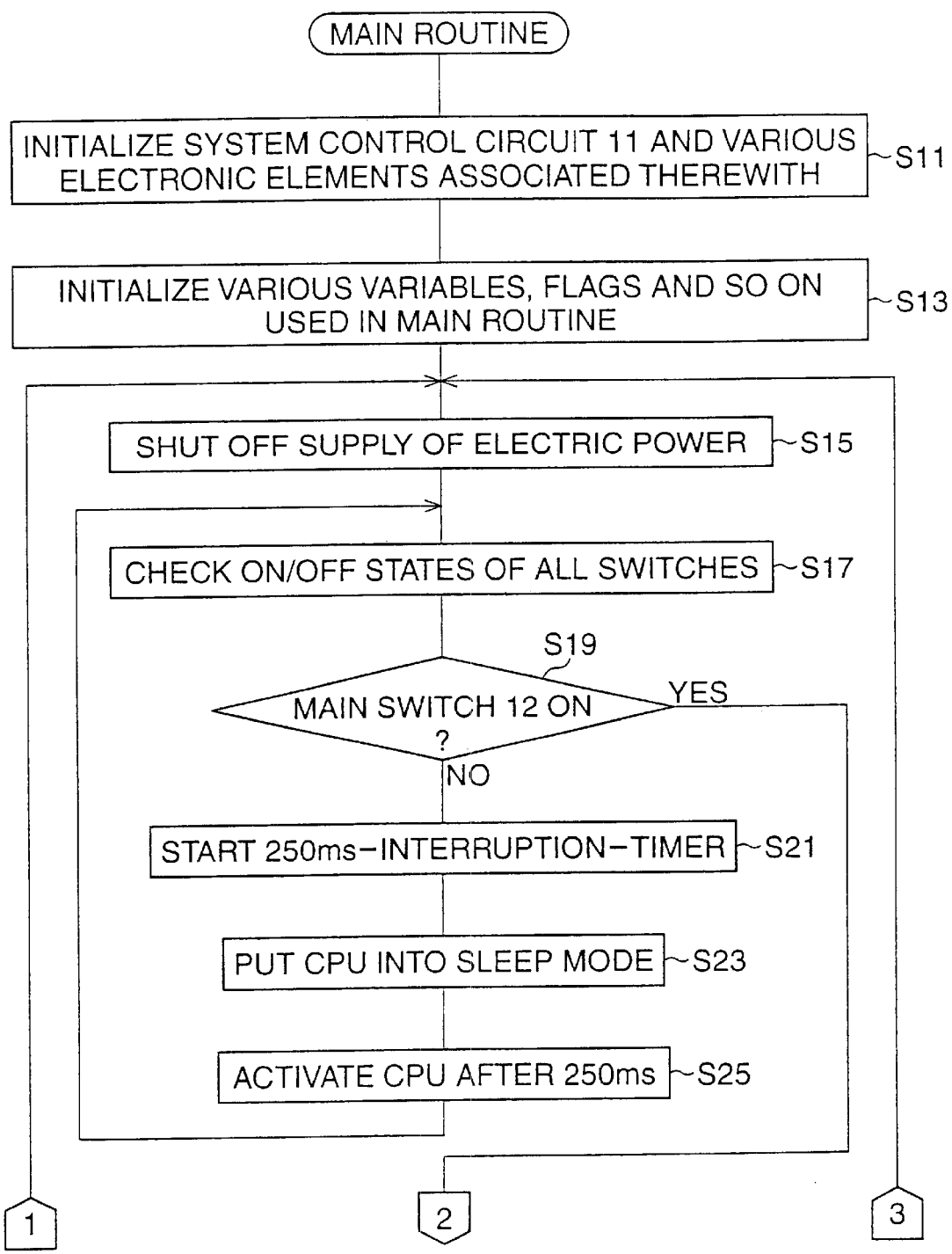
FIG. 4 is a flowchart of a part of a main routine executed is a system control circuit of the SLR camera.
Figure 5:
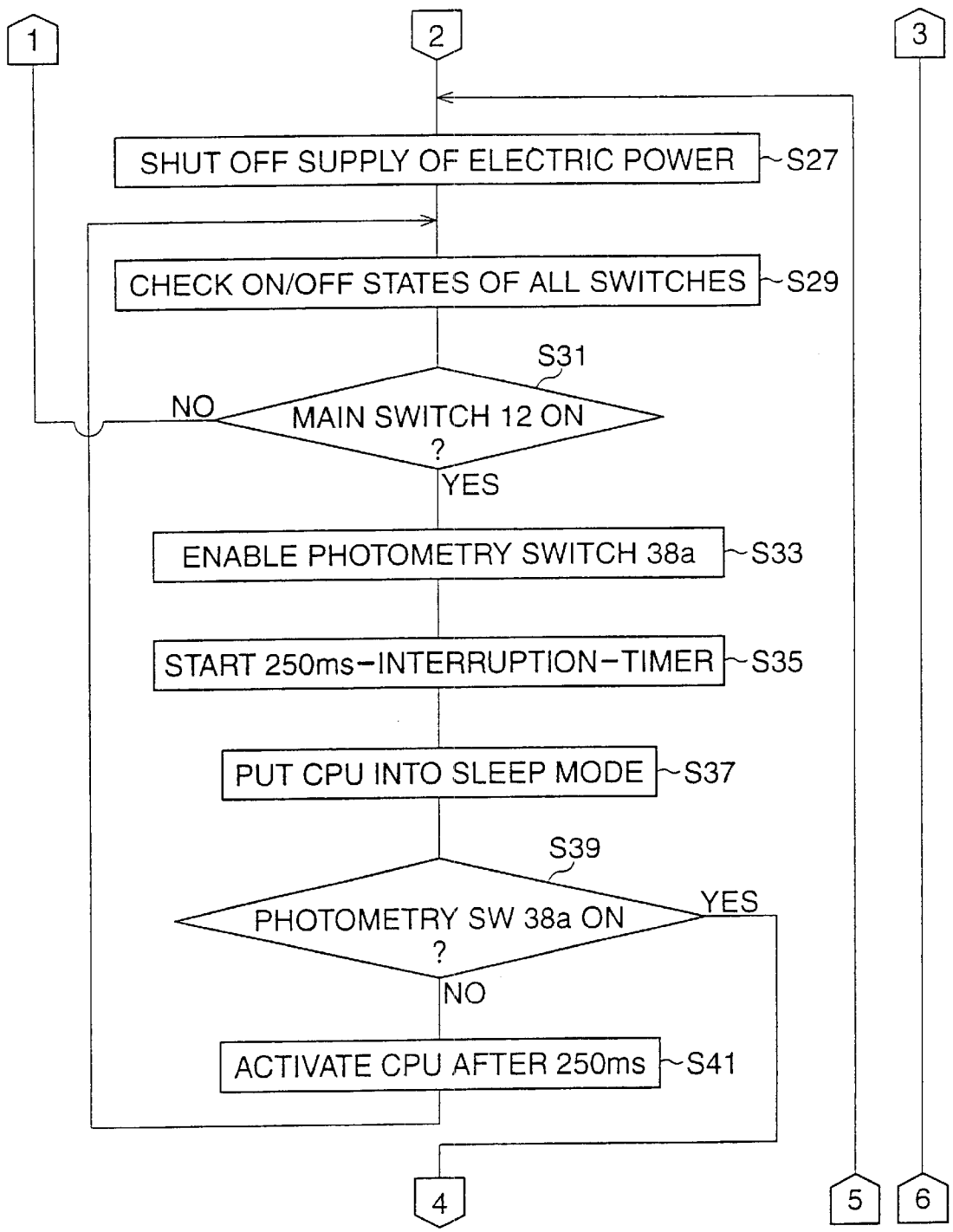
FIG. 5 is a flowchart of another part of the main routine.
Figure 6:
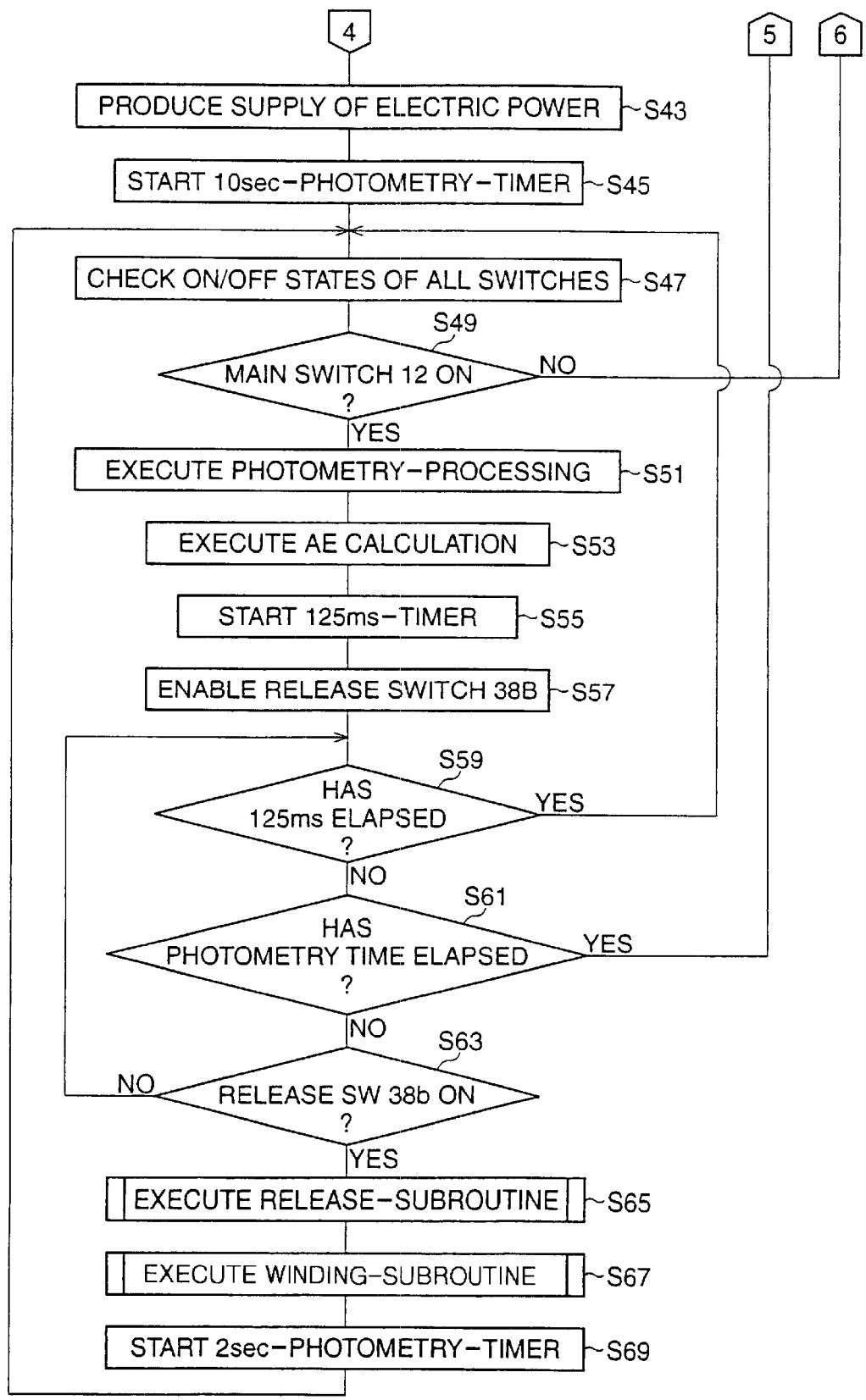
FIG. 6 is a flowchart of the remainder of the main routine.
Figure 7:
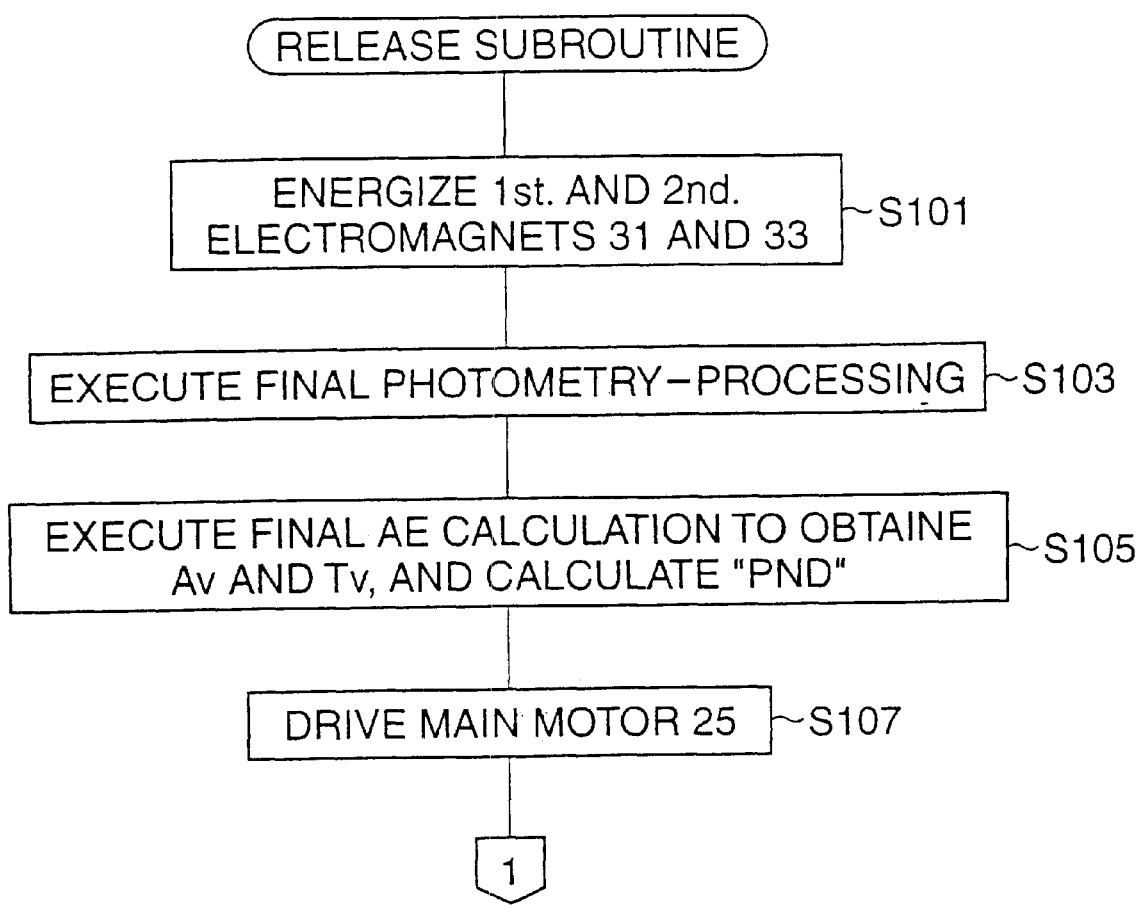
FIG. 7 is a flowchart of a part of a release subroutine forming a part of the main routine.
Figure 8:
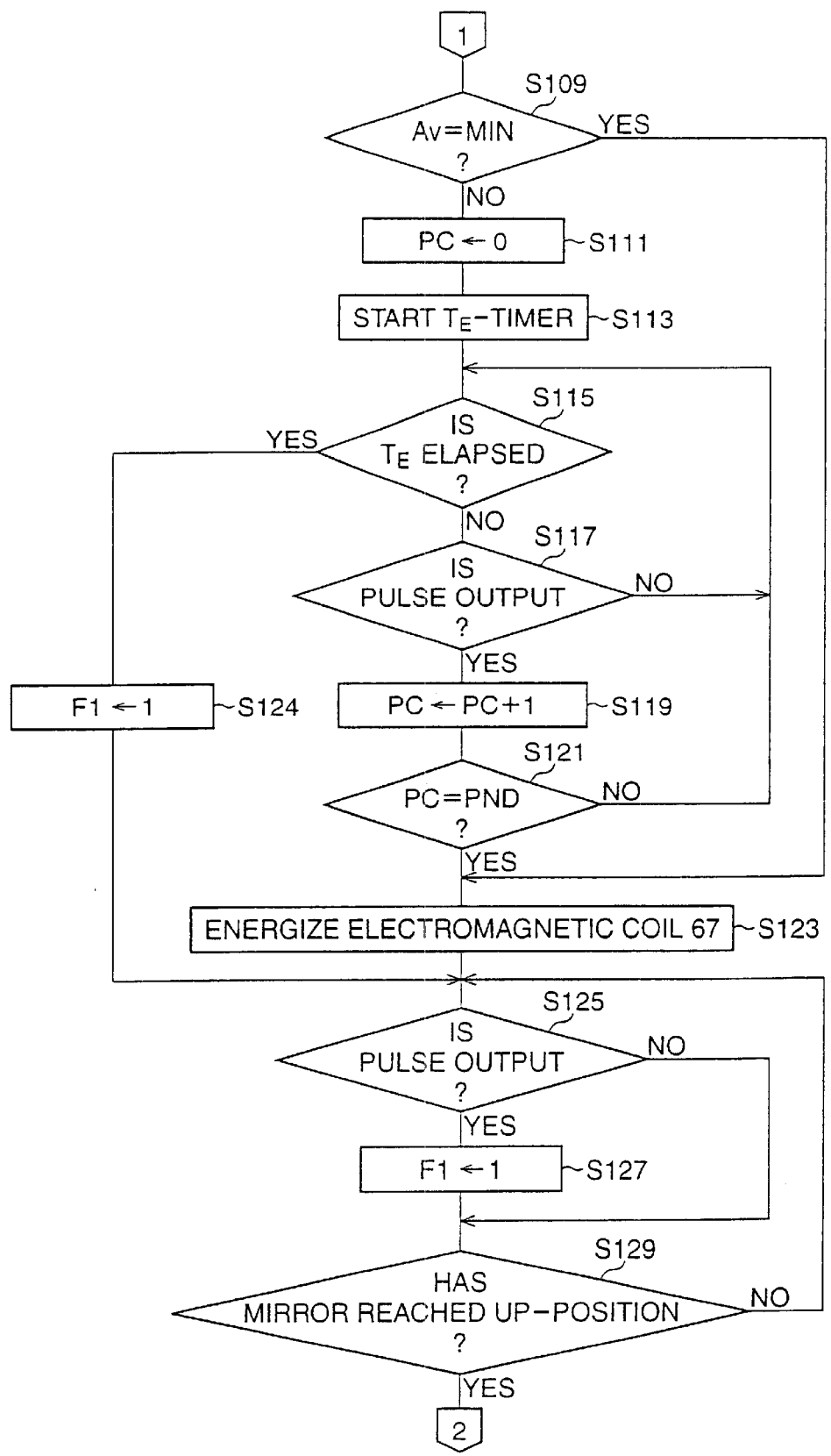
FIG. 8 is a flowchart of another part of the release subroutine.
Figure 9:
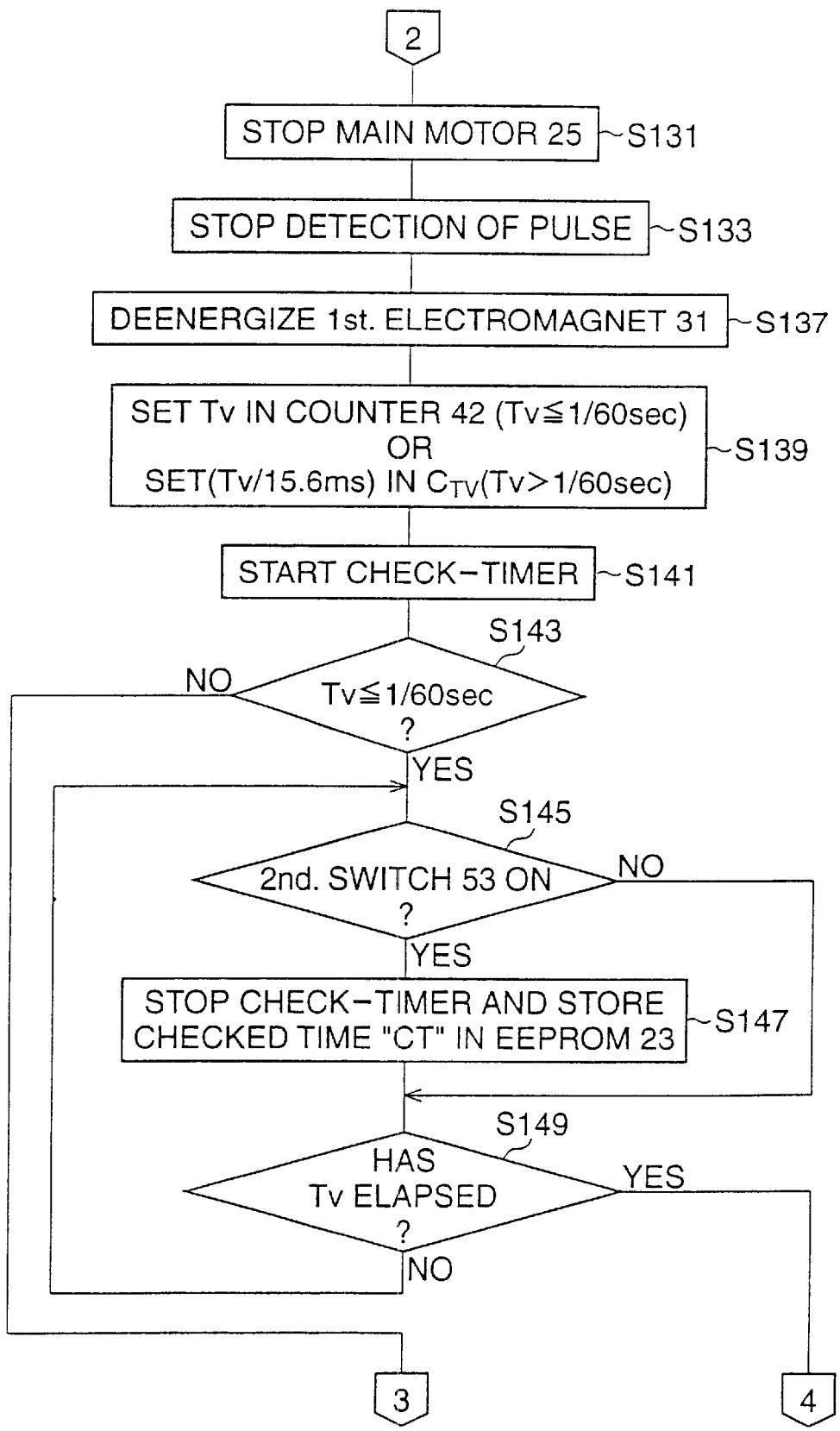
FIG. 9 is a flowchart with a continuation of the flowchart of the release subroutine.
Figure 10:
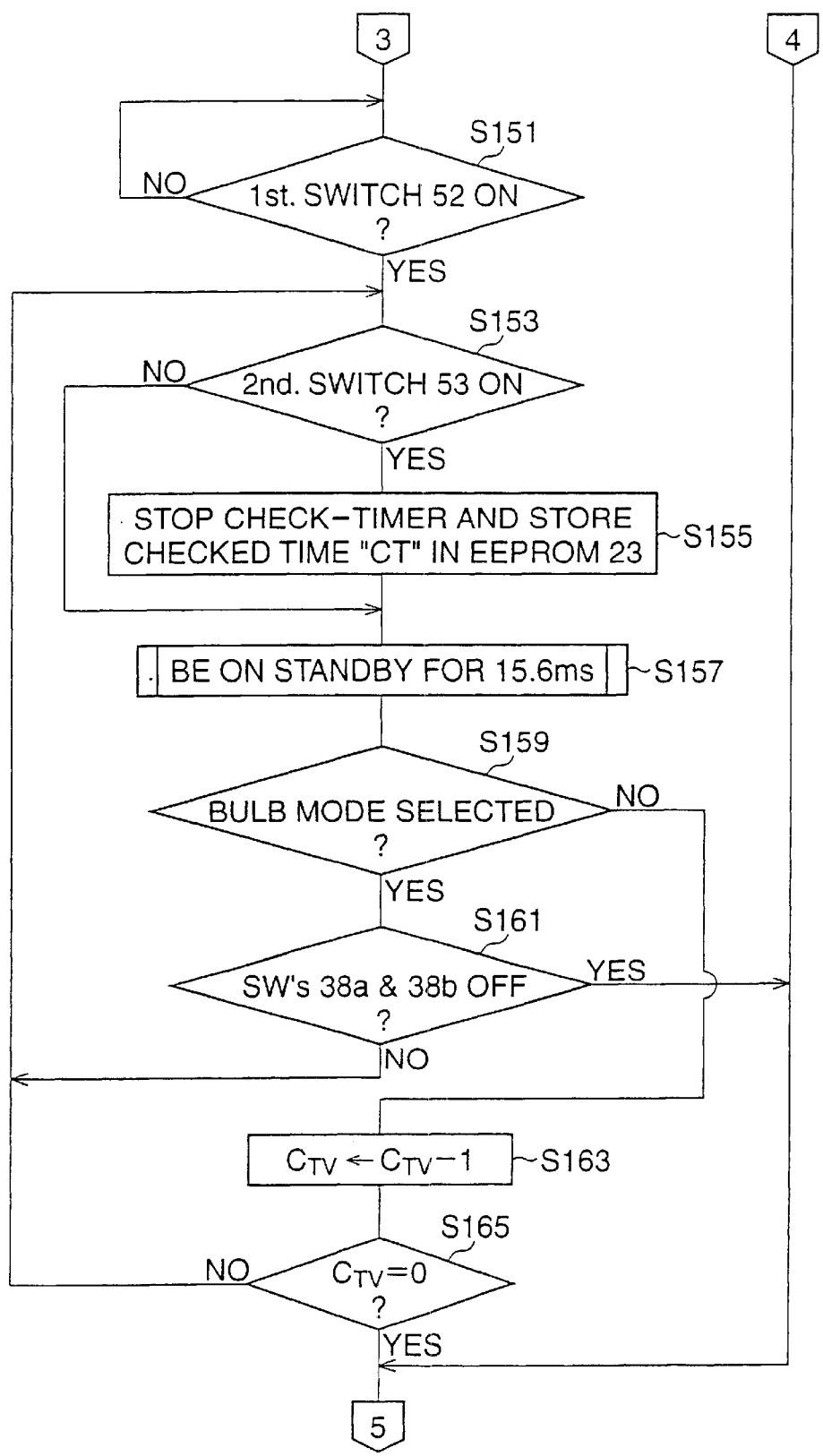
FIG. 10 is another flowchart with a continuation of the flowchart of the release subroutine.
Figure 11:
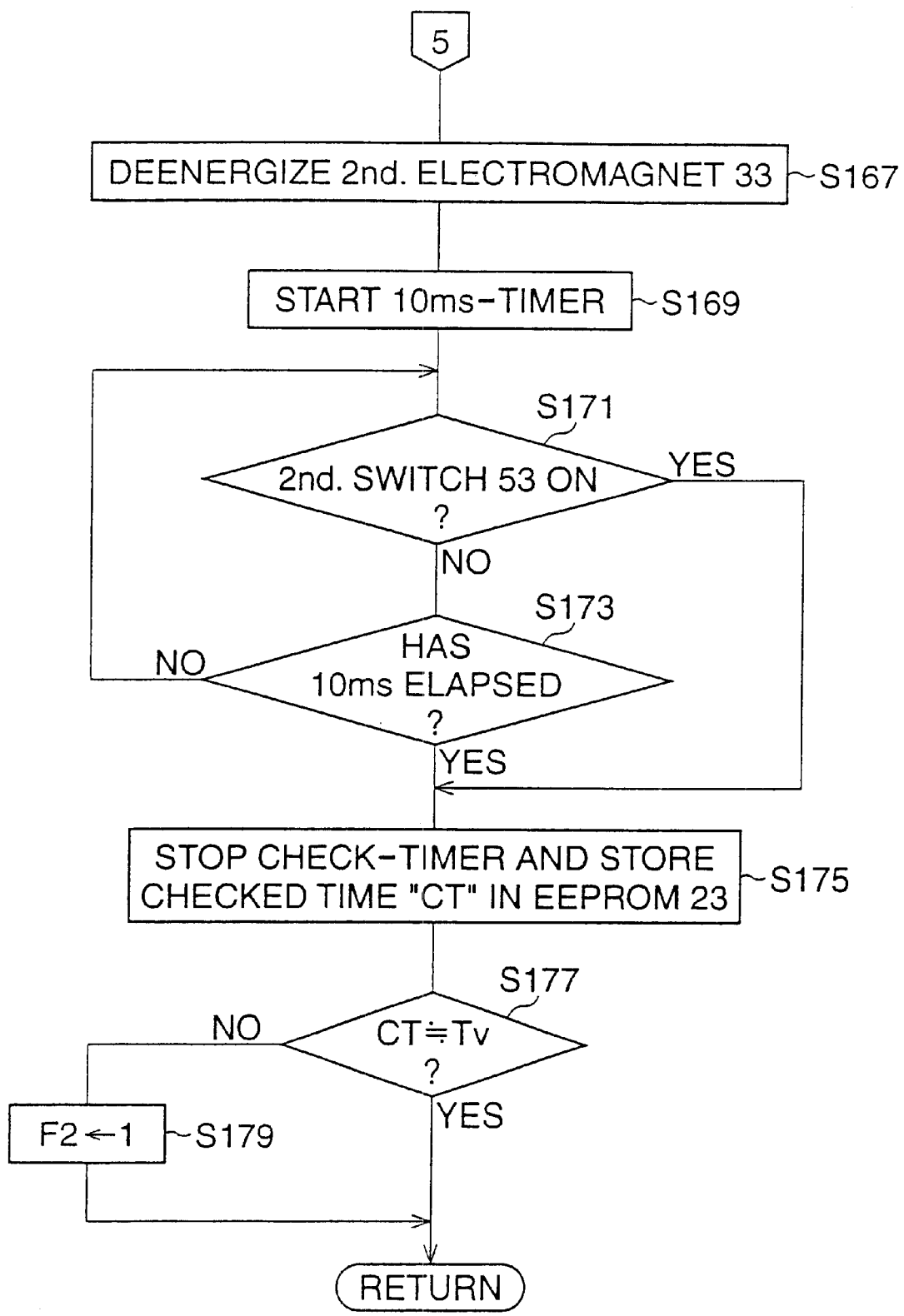
FIG. 11 is a flowchart of the remainder of the release subroutine.

FIGS. 4 to 6 show a flowchart of a main routine executed in the system control circuit 11 of the camera 10. Namely, the camera 10 operates in accordance with the main routine. The main routine is constituted as a loop routine repeatedly executed at a predetermined time interval, and an execution of the main routine is started by loading the battery (not shown) into the camera 10, regardless of he position of the main or power switch bar 37.

At step S11, the system control circuit 11 and various peripheral electronic elements associated therewith are subjected to initialization. Namely, the battery is loaded into the camera 10, the system control circuit 11 and the various peripheral electronic elements connected thereto are initialized. Then, at step S13, associated variables, flags and so on, used in this routine, are initialized. Subsequently, at step S15, the supply of electric power to the peripheral electronic elements is shut off.

At step S17, the ON/OFF states of all the switches (except for the main switch 12) are checked. If any one switch is in an ON-state, a process associated with that switch is executed. Then, at step S19, it is determined whether the main or power switch 12 is in an ON-state. When the main switch 12 is in an OFF-state, the control proceeds to step S21, in which a 2350 ms-interruption timer is started.

At step S23, the CPU of the system control circuit 11 is put into sleep mode, in which power consumption is approximately zero. Thereafter, there is no progress until a time of 250 ms is counted by the 250 ms-interruption timer. When the time of 250 ms has elapsed, the CPU of the system control circuit 11 is activated from the sleep mode (S25), and the control returns to step S17. Namely, in the routine comprising steps S17, S19, S21, S23 and S25, whenever a time of 250 ms has elapsed, it is checked whether the main switch 12 is in the ON-state.

At step S19, when it is confirmed that the main switch 12 is in the ON-state, the control proceeds from step S19 to step S27, in which the supply of electric power to the various peripheral electronic elements is shut off. Then, at step S29, the ON/OFF states of all the switches (except for the mains witch 12) are checked. If any one switch is in an ON-state, a process associated with that switch is executed. Subsequently, at step S31, it is determined whether the main switch 12 is in the ON-state. When the main switch 12 is in the OFF-state, the control returns to step S15.

At step S31, when it is confirmed that the main switch 12 is in the ON-state, the control proceeds to step S33, in which the photometry switch 38a is enabled. Then, at step S35, the 250 ms-interruption timer is started.

At step S37, the CPU of the system control circuit 11 is put into the sleep mode. Then, at step S39, it is determined whether the photometry switch 38a has been turned ON, i.e. whether the release switch button 38 has been partly depressed. When the turn-ON of the photometry switch 38a is not confirmed, there is no progress until a time of 250 ms is counted by the 250 ms-interruption timer. When the timer of 250 ms has elapsed, the CPU of the system control circuit 11 is activated from the sleep mode (S41), and then the control returns to step S29. Namely, in the routine comprising steps S29, S31, S33, S35, S37, S39 and S41, whenever a time of 250 ms has elapsed, it is checked to confirm whether the photometry switch 38a is in the ON-state as long as the main switch 12 is in the ON-state.

At step S39, when it is confirmed that the photometry switch 38a is in the ON-state, the control proceeds to step S43, in which the supply of electric power to the various peripheral electronic elements is initiated. Then, at step S45, a 10 sec-photometry-timer is started. Note that, in the 10 sec-photometry-timer, a time of 10 sec is considered enough time to perform the photometry.

At step S47, the ON/OFF states of all the switches (except for the main switch 12) are checked. If any one switch is in an ON-state, a process associated with that switch is executed. Then, at step S49, it is determined whether the main switch 12 is in the ON-state. When the main switch 12 is in the OFF-state, the control returns to step S15.

At step S49, when it is confirmed that the main switch 12 is in the ON-state, the control proceeds to step S51, in which a photometry-processing is executed. In the photometry-processing, the system control circuit 11 retrieves a digital brightness value data $B_V$ from the custom IC 13. As already stated above, the brightness value data $B_V$ is derived from a brightness signal, produced by the photometry sensor of the photometry circuit 15, which represents a brightness of a scene to be photographed.

At step S53, the AE calculation is executed, using the retrieved brightness value $B_V$ and the DX code data ($B_v$), thereby determining an exposure value $E_V$, and then a shutter speed $T_V$ and a stop value $A_V$ are calculated from the exposure value $E_V$. At step S55, a 125 ms-timer is started, and then, at step S57, the release switch 38b is enabled.

At step S59, it is determined whether a time of 125 ms is counted by the 125 ms-timer. When the time of 125 ms has not elapsed, the control proceeds to step S61, in which it is determined whether the time of 10 sec is counted by the 10 sec-photometry timer (S45). When the time of 10 has not elapsed, the control proceeds to step S63, in which it is determined whether the release switch 38b is in the ON-state. When the release switch 38b is in the OFF-state, the control returns to step S59.

At step S59, when the time of 125 ms is counted by the 125 ms-timer, the control returns to step S47, and the routine comprising steps S47, S49, S51, S53, S55 and S57 is again executed. Namely, the shutter speed $T_V$ and stop value $A_V$ are renewed every 125 ms as long as the main switch 12 is not turned OFF (S49).

At step S61, when the time of 10 sec is counted by the 10 sec-photometry-timer, the control returns to step S27. Namely, when the release switch 38b is not turned ON over the time of 10 sec (S63), the photometry is suspended. Of course, if the ON-state of the photometry switch 38a is maintained (S39), the photometry is resumed.

At step S63, when it is confirmed that the release switch 38b is in the ON-state, the control proceeds to step S65, in which a release subroutine is executed to perform a photographing operation. Note that, the release subroutine is explained in detail with reference to FIGS. 7 to 11 hereinafter.

After the execution of the release subroutine, i.e. after the performance of the photographing operation, the control proceeds to step S67, in which a one-frame-winding subroutine is executed for winding the photographic film on from the film cartridge by a length corresponding to one frame. After the execution of the winding-subroutine, the control proceeds to step S69.

At step S69, a 2 sec-photometry-timer, in which a time of 2 sec is suitably set as a photometry time, is started, and the control returns to step S49. Namely, after the completion of the winding of the one-frame length of the photographic film, the photometry is continued for 2 sec (S61), and a further photographing operation is immediately performed as long as the release switch 38b is still in the ON-state (S63).

FIGS. 7 to 11 show a flowchart of the release subroutine executed in step S65.

At step S101, the first and second electromagnets 31 and 33 are electrically energized such that the leading and trailing shutter curtains are magnetically attracted to the first and second electromagnets 31 and 33, respectively. After the energization of the first and second electromagnets 31 and 33, the third electromagnet 35 is energized so that the shutter lock mechanism is unlocked, thereby releasing the leading and trailing shutter curtains from the shutter lock mechanism. However, both the shutter curtains still remain at the initial positions due to the magnetic attraction of the respective leading and trailing shutter curtains to the first and second electromagnets 31 and 33.

At step S103, a final photometry-processing is executed. Similar to the aforementioned photometry-processing, the system control circuit 11 retrieves a brightness value data $B_V$ from the custom IC 13. Then, at step S105, the AE calculation is executed, using the retrieved brightness value $B_V$ and the DX code data ($B_V$), thereby determining an exposure value $E_V$, and a shutter speed $T_V$ and a stop value $A_V$ are then calculated from the exposure value $E_V$. The calculated shutter speed $T_V$ and stop value $A_V$ are respectively stored as a shutter speed data and a stop value data in the EEPROM 23. Also, at step S105, a number of pulses corresponding to the calculated stop value $A_V$ is calculated and stored as a pulse-number data PND in the EEPROM 23. Note that, as stated above, the number of pulses corresponding to the stop value $A_V$ must be output from the slit detector 29 before the diaphragm can reach the calculated stop value data $A_V$.

At step S107, the main motor 25 is driven such that the mirror of the movable mirror mechanism is moved from the down-position to the up-position, and the plate lock mechanism is unlocked so that the slidable plate element 63 is elastically moved from the initial position in the direction A (FIG. 2). Then, at step S109, it is determined whether the calculated stop value $A_V$ is a minimum stop value corresponding to the full-open aperture of the diaphragm. When the stop value $A_V$ is larger than the minimum stop value, the control proceeds to step S111, in which a pulse counter PC is reset to "0".

At step S113, a $T_E$-timer is started. In the $T_E$-timer, a time of $T_E$ is set, and is considered enough time to move the slidable plate element 63 from the initial position (FIG. 2) to an end position corresponding a maximum stop value of the diaphragm. Then, at step s115, it is determined whether the time of $T_E$ has been counted by the $T_E$-timer. When the time of $T_E$ has not elapsed, the control proceeds to step S117, in which it is detected whether a pulse is output from the slit detector or photo-interrupter 29.

At step S117, when a pulse is not detected, the control returns to step S115. On the other hand, when a pulse is detected, the control proceeds to step S119, in which a count number of the pulse counter PC is incremented by "1". Then, at step S121, it is determined whether the count number of the pulse counter PC reaches the pulse-number data PND corresponding to the calculated stop value $A_V$. If PC<PND, the control returns to step S115.

In short, the routine comprising steps S115, S117, S119 and S121 is repeated until the count number of the pulse counter PC reaches the pulse-number data PND.

At step S121, when it is confirmed that the count number of the pulses counter PC has reached the pulse-number data PND, the control proceeds to step S123, in which the electromagnetic coil 67 is electrically energized such that the two-armed lever 64 is released from the magnetic attraction of the permanent magnet 66. Namely, the pawl 64a of the two-armed lever 64 is engaged with one of the teeth 63b of the slidable plate element 63, whereby the movement of the slidable plate element 63 in the direction A (FIG. 2) is halted, so that the aperture of the diaphragm must be in accord with the stop value data $A_V$.

At step S115, when the time of $T_E$ has elapsed without the count number of the pulses counter PC reaching the pulse-number data PND, it may be considered that the diaphragm actuating mechanism (FIG. 2) has erroneously operated. For example, the slidable plate element 63 may be accidentally jammed, resulting in premature stoppage of the slidable plate element 63 without energizing the electromagnetic coil 67. Thus, in this case, the control proceeds from step S115 to step S124, in which an $A_V$-error flag F2 is made to be "1".

After the energization of the electromagnetic coil 67 (S123), the control proceeds to step S125, in which it is further detected whether a pulse is output from the slit detector or photo-interrupter 29, because the pawl 64a of the two-armed lever 64 may fail to engage with one of the teeth 63b of the slidable plate element 63. Thus, at step 125, when a pulse is detected, the control proceeds to step S127, in which the $A_V$-error flag F1 is made to be "1". Also, at step S125, when a pulse is not detected, the control skips step S127 to step S129.

In either event, at step S129, it is determined whether the mirror of the movable mirror mechanism has reached the up-position. When the mirror does not reach the up-position, the control returns to step S125, and the routine comprising steps S125, S127 and S129 is repeated until the mirror reaches the up-position. Namely, the detection of a pulse from the slit detector 29 is continued until the mirror reaches the up-position.

At step S129, when it is confirmed that the mirror has reached the up-position, the control proceeds to step S131, in which the main motor 25 is stopped. Then, at step S133, the detection of the pulse is stopped.

At step S137, the first electromagnet 31 is de-energized, and the leading shutter curtain is released from the magnetic attraction of the first electromagnet 31. Thus, the leading shutter curtain is elastically moved from the initial position toward the end position.

At step S139, when the calculated shutter speed data $T_V$ is faster than 1/60 sec, a time of $T_V$ is set in the counter 42. Alternatively, when the calculated shutter speed $T_V$ is slower than 1/60 sec, a time of $T_V$/15.6 ms is set in a counter $C_{TV}$. Note, the counter $C_{TV}$ is defined by the system control circuit 11. Then, at step S141, a check-timer is started to count an actual shutter-open time of the focal plane shutter.

At step S143, it is determined whether the shutter speed data $T_V$ is equal to or faster than 1/60 sec. If $T_V \leq 1/60$ sec, the control proceeds to step S145, in which it is determined whether the second detection switch 53 has been turned ON, i.e. whether the trailing shutter curtain has reached the end position.

Usually, at this stage, there is no case where the second detection switch 53 is turned ON, because the second electromagnet 33 is still not de-energized, i.e. because the trailing shutter curtain is still not released from the magnetic attraction of the second electromagnet 33. Nevertheless, there may be a case where a movement of the trailing shutter curtain from the initial position to the end position has been accidentally completed, because, for example, the second electromagnet 33 failed to magnetically attract the trailing shutter curtain when being energized (S101).

At step S145, when it is confirmed that the second detection switch 53 is turned ON, the control proceeds to step S147, in which the check-timer is immediately stopped, and a time, counted by the check-timer, is stored as checked time data CT in the EEPROM 23.

At step S145, as long as the second detection switch 53 is not turned ON, the control skips S147 to step S149, in which it is determined whether the time of $T_V$ has been counted by the counter 42. When it is confirmed that the time of $T_V$ has been counted by the counter 42, the control skips to step S167 (FIG. 11), in which the second electromagnet 33 is de-energized, and the trailing shutter curtain is released from the magnetic attraction of the second electromagnet 33. Thus, the trailing shutter curtain is elastically moved from the initial position toward the end position.

At step S169, a 10 ms-timer is started. Note that, in the 10 ms-timer, a time of 10 ms is set as a time in which the trailing shutter curtain can be easily moved from the initial position to the end position.

At step S171, it is determined whether the second detection switch 53 has been turned ON, i.e. whether the trailing shutter curtain has reached the end position. Then, at step S173, it is determined whether the time of 10 ms has been counted by the 10 ms-timer. Thereafter, the control returns to step S171, and the routine comprising steps S171 and S173 is repeated until the second detection switch 53 is turned ON or until the time of 10 ms is counted by the 10 ms-timer.

Of course, at step S171, when it is confirmed that the second detection switch 53 has been turned ON, i.e. that the trailing shutter curtain has reached the end position, the control proceeds from step S171 to step S175. On the other hand, when the time of 10 ms has been counted by the 10 ms-timer without the second detection switch 53 being turned ON, i.e. when the trailing shutter curtain could not have accidentally reached the end position, the control proceeds from the step S173 to step S175. In either case, at step 175, the check-timer is stopped, and the time, counted by the check-timer, is stored as checked time data CT in the EEPROM 23.

At step S177, it is determined whether the checked time data CT is substantially equal to the shutter speed data $T_V$ stored in the EEPROM 23. If $CT \neq T_V$, the control proceeds to step S179, in which a $T_V$-error flag F2 is made to be "1". Thereafter, the control returns to the main routine (FIGS. 4 to 6).

At step S143, if $T_V > 1/60$ sec, the control proceeds to step S151 (FIG. 10), in which it is determined whether the first detection switch 52 has been turned ON, i.e. whether the leading shutter curtain has reached the end position. Namely, there is no progress until the first detection switch 52 has been turned ON.

At step S151, when it is confirmed that the first detection switch 52 has been turned, the control proceeds to step S153, in which it is determined whether the second detection switch 53 has been turned ON, i.e. whether the trailing shutter curtain has reached the end position.

Similar to the aforementioned case, usually, at this stage, there is no case where the second detection switch 53 is turned ON, but there occasionally may be a case where a movement of the trailing shutter curtain from the initial position to the end position has been accidentally completed for the same reason as mentioned above.

At step S153, when it is confirmed that the second detection switch 53 is turned ON, the control proceeds to step S155, in which the check-timer is immediately stopped, and a time, counted by the check-timer, is stored as checked time data CT in the EEPROM 23.

At step S153, as long as the second detection switch 53 is not turned ON, the control skips S155 to step S157, in which the control is on standby for 15.6 ms. After 15.6 ms, the control proceeds to step S159, in which it is determined whether the bulb mode is selected by the exposure mode selection switch 43. When the bulb mode is not selected, the control proceeds to step S163, in which the counter $C_{TV}$ is decremented by "1". Then, at step S165, it is determined whether the counter $C_{TV}$ has reached "0". If $C_{TV} \neq 0$, the control returns to step S153, and the counter is decremented by "1" every 15.6 ms.

At step S165, when it is confirmed that the counter $C_{TV}$ has reached "0", the control proceeds to step S167 (FIG. 11), in which the second electromagnet 33 is de-energized, and the trailing shutter curtain is released from the magnetic attraction of the second electromagnet 33. Thus, the trailing shutter curtain is elastically moved from the initial position toward the end position.

Similar to the aforementioned case, after the second electromagnet 33 is de-energized, the 10 ms-timer is started (S169), and a monitoring process is carried out to see whether the second detection switch 53 is turned ON or the time of 10 ms is counted by the 10 ms-timer (S171 and S173). Then, the check-timer is stopped, and the time, counted by the check-timer, is stored as checked time data CT in the EEPROM 23 (S175). If $CT \neq T_V$, the $T_V$-error flag F2 is made to be "1" (S179).

At step S159, when the bulb mode is selected, the control proceeds to step S161, in which it is determined whether both the photometry switch 38a and the release switch 38b have been turned OFF. When both the switches 38a and 38b are turned OFF, the control proceeds to step S167, in which the second electromagnet 33 is de-energized, and the trailing shutter curtain is released from the magnetic attraction of the second electromagnet 33. Thus, the trailing shutter curtain is elastically moved from the initial position toward the end position.

Similar to the aforementioned cases, it is monitored whether the second detection switch 53 is turned ON or the time of 10 ms is counted by the 10 ms-timer (S171 and S173). Then, the check-timer is stopped, and the time, counted by the check-timer, is stored as checked time data CT in the EEPROM 23 (S175). If $CT \neq T_V$, the $T_V$-error flag F2 is made to be "1" (S179).

Figure 12:
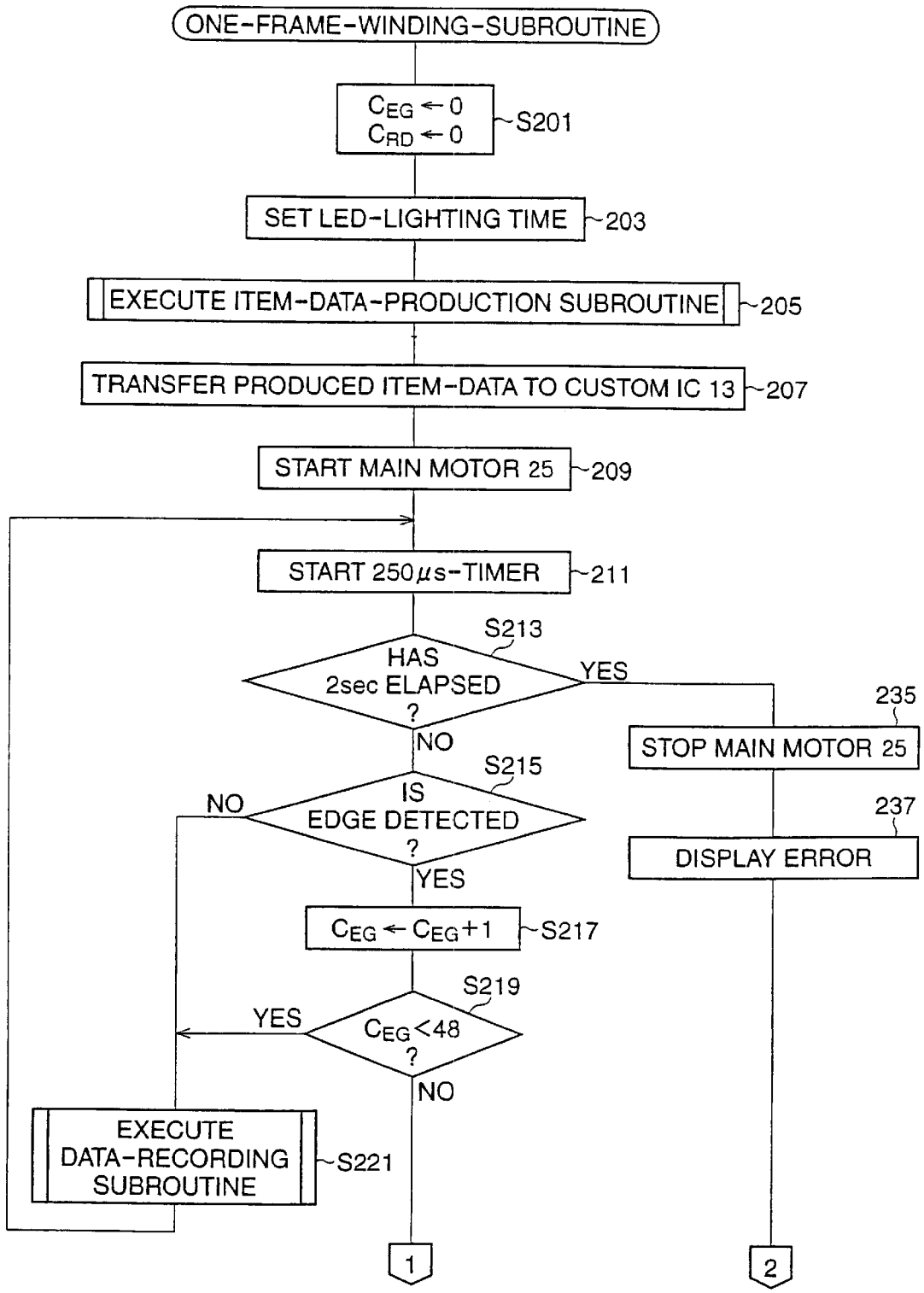
FIG. 12 is a flowchart of a part of a one-frame-winding subroutine forming a part of the main routine.
Figure 13:
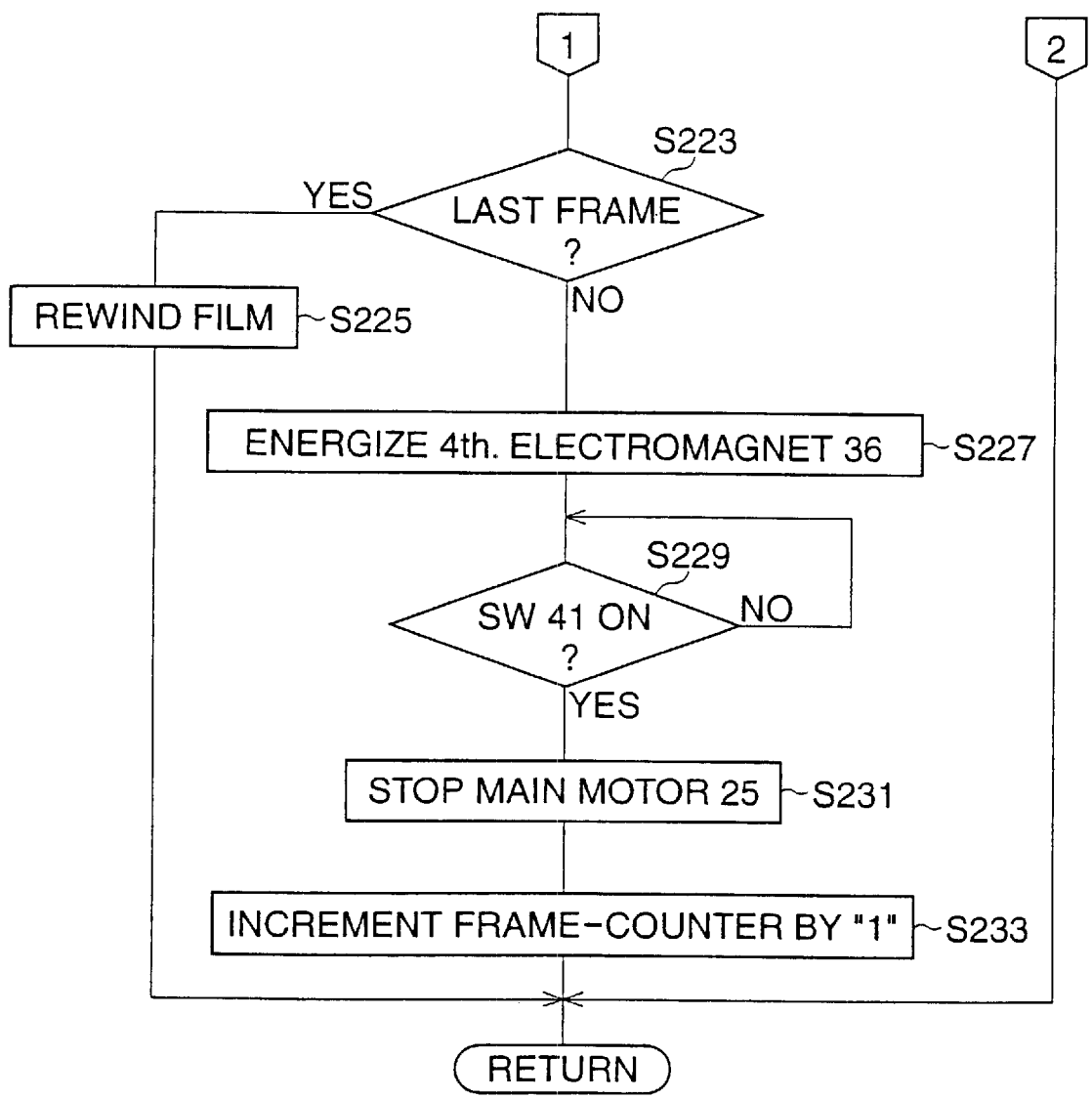
FIG. 13 is a flowchart of the remainder of the one-frame winding subroutine.

FIGS. 12 and 13 show a flowchart of the one-frame-winding subroutine executed in step S67.

At step S201, a film-feeding-pulse-edge counter $C_{EG}$ and a recording counter $C_{RD}$ are set to "0".

The counter $C_{EG}$ counts leading and trailing edges of a film-feeding pulse output from the film feeding detector or photo-interrupter 27. As stated above, the one frame length of the photographic film corresponds to 24 film-feeding pulses. Thus, when a count number of the counter $C_{EG}$ reaches "48", the winding on of the one frame length of the photographic film from the film cartridge is completed.

The recording counter $C_{RD}$ is used in an execution of a data-recording subroutine (S221). In the execution of this subroutine, the photographic data ($A_V$, $T_V$) are recorded on a margin area of the photographed frame of the photographic film. In this embodiment, first, the stop value data $A_V$ is recorded, and then the shutter speed data $T_V$ is recorded. When the recording of the stop value data $A_V$ is completed, the counter $C_{RD}$ is incremented by "1", and, when the recording of the shutter speed data $T_V$ is completed, the counter $C_{RD}$ is further incremented by "1".

At step S203, a period of lighting time, in which the individual light-emitting diodes (LED) of the optical writer 19 are lit when the photographic data ($A_V$, $T_V$) are recorded on the margin area of the photographed frame, is set in accordance with the DX code data ($B_V$) representing the sensitivity of the photographic film used.

At step S205, an item-data-production subroutine is executed. In the execution of this subroutine, $A_V$-item data and $T_V$-item data, to be recorded on the margin area of the photographed frame, are produced on the basis of the $A_V$-error flag F1 and stop valued data $A_V$ and the $T_V$-error flag F2 and shutter speed data $T_V$, respectively. Then, at step 207, the produced $A_V$-item data and $T_V$-item data are transferred from the system control circuit 11 to the custom IC 13. Note that, the item-data-production subroutine is explained in detail later with reference to FIGS. 14 and 15.

At step S209, the main motor 25 is driven to wind the photographic film on from the film cartridge by the length corresponding to the one frame. Then, at step S211, a 250 µs-timer is started. The 250 µs-timer counts a time of 250 µs to control a timing of lighting of the individual light-emitting diodes (LED) of the optical writer 19 while recording the $A_V$-item data and $T_V$-item data on the margin area of the photographed frame of the photographic film. Namely, the light-emitting diodes (LED) are selectively lit every 250 µs in accordance with the $A_V$-item data and $T_V$-item data to be recorded.

At step S213, it is determined whether a time of 2 sec has elapsed from the time when the main motor 25 is driven (S209). The time of 2 sec is considered enough time to perform the winding of the one frame length of the photographic film. When the time of 2 sec has not elapsed, the control proceeds to step S215, in which it is determined whether an edge (a leading edge or a trailing edge) of a film-feeding pulse output from the film-feeding detector 27 has been detected.

At step S215, when the edge of the pulse is not detected by the film-feeding detector 27, the control skips steps S217 and 219 to step S221, in which the aforementioned data-recording subroutine is executed to record the $A_V$-item data and $T_V$-item data the margin area of the photographed frame. On the other hand, when the edge of the pulse is detected by the film-feeding detector 27, the control proceeds to step S217, in which the a count number of the film-feeding-pulse-edge counter $C_{EG}$ is incremented by "1". Then, at step S219, it is determined whether the count number of the counter $C_{EG}$ has reached "48". If $C_{EG}$<48, the control proceeds from step S219 to step S221 in which the data-recording subroutine is executed. Note that, the data-recording subroutine is explained in detail hereinafter with reference to FIG. 19.

At step S219, when it is confirmed that the count number of the counter $C_{EG}$ has reached "48", i.e. when it is confirmed that the winding of the one frame length of the photographic film has been completed, the control proceeds to step S223, in which it is determined whether the photographed frame concerned is the last one.

If the photographed frame concerned is the last one, the control proceeds to step S225, in which the main motor 25 is reversely driven to rewind the photographic film into the film cartridge. Thereafter, the control returns to the main routine (FIGS. FIGS. 4 to 6).

At step S223, when it is confirmed that the photographed frame concerned is not the last one, the control proceeds to step S227, in which the fourth electromagnet 36 is energized to initiate the film latch mechanism, thereby immediately halting the movement of the photographic film. Then, at step S229, it is determined whether the third detection switch 41, associated with the film latch mechanism, has been turned ON.

At step S229, when it is confirmed that the third detection switch 41 has been turned ON, i.e. when the halt of the movement of the photographic has been detected, the control proceeds to step S231, in which the main motor 25 is stopped. Then, at step S233, a count number of a frame-counter is incremented by "1". Thereafter, the control returns to the main routine (FIGS. 4 to 6).

At step S213, when it is confirmed that the time of 2 sec has elapsed from the time when the main motor 25 is driven (S209), i.e. when it is confirmed that trouble has occurred in the film-feeding, the control proceeds to step S235, in which the main motor 25 is immediately stopped. Then, at step S236, an error message is displayed on a suitable display device (not shown) provided on the camera body, to indicate a problem with the film-feeding.

Figure 14:
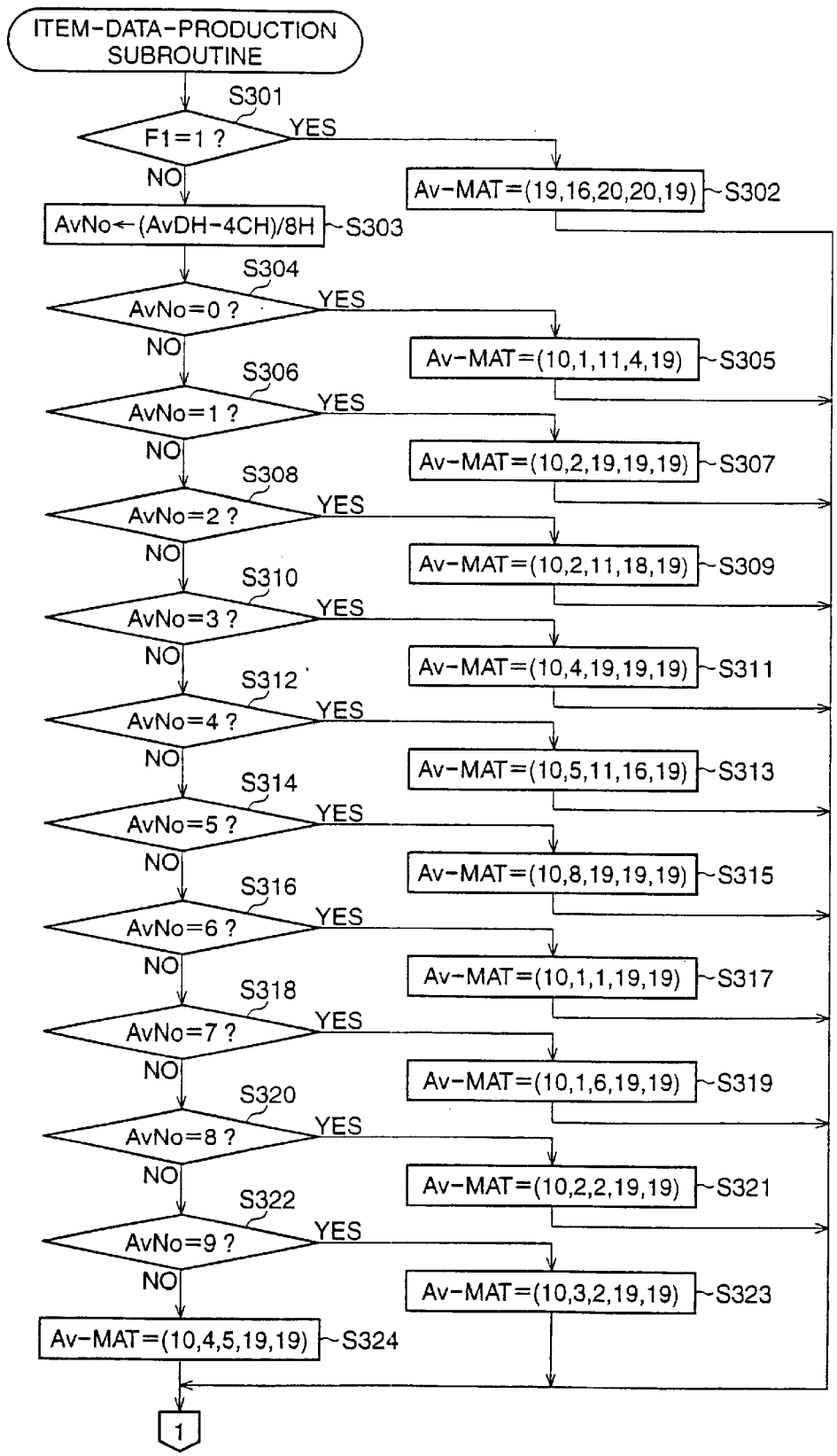
FIG. 14 is a flowchart of a part of an item-data-production subroutine forming a part of the one-frame-winding subroutine.
Figure 15:
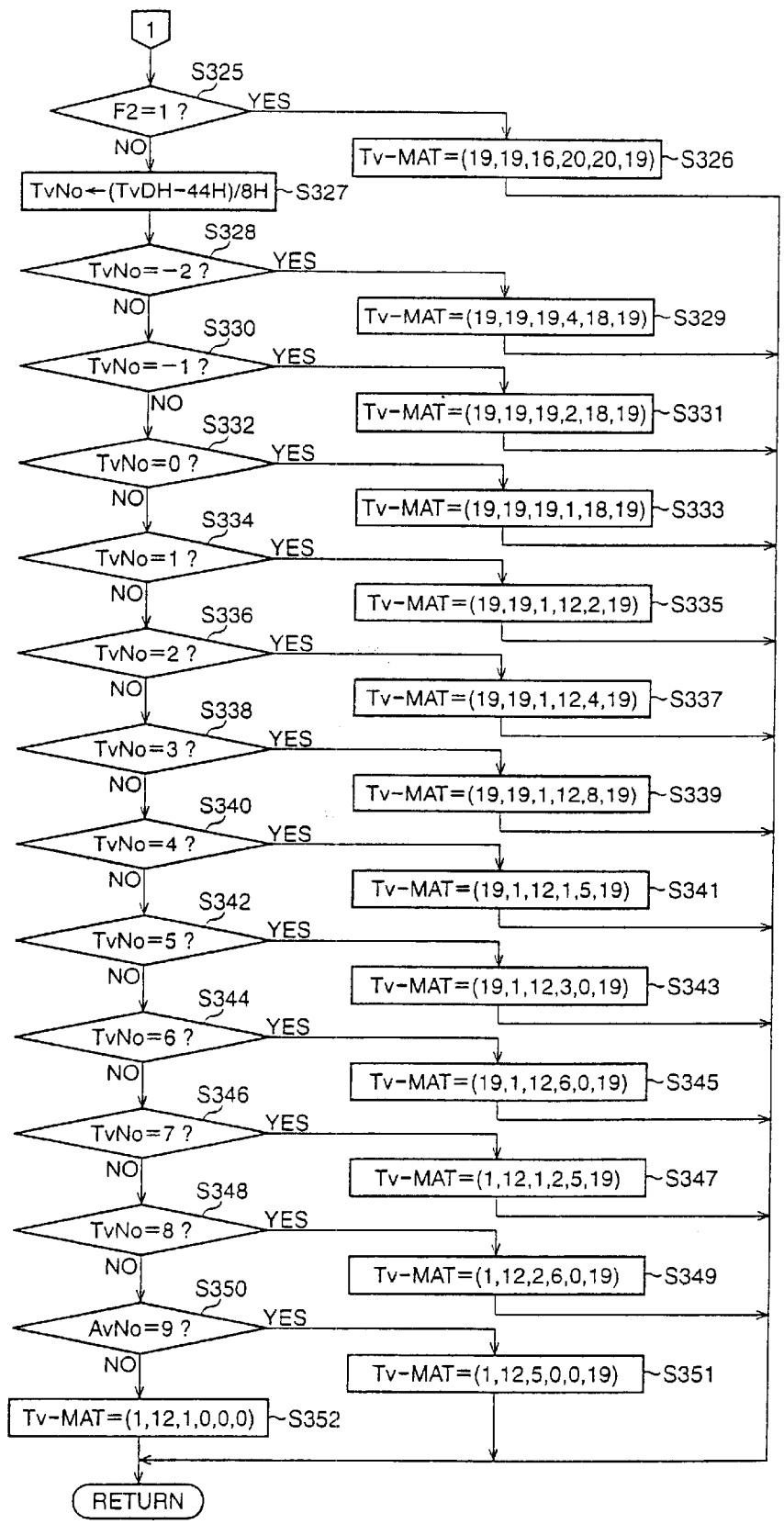
FIG. 15 is a flowchart of the remainder of the item-data-production subroutine.

FIGS. 14 and 15 show a flowchart of the item-data-production subroutine executed in step S205 of the one-frame-winding subroutine (FIGS. 12 and 13).

In the execution of this subroutine, respective first and second recording-formats $A_V$-MAT and $T_V$-MAT are used to record the stop value data $A_V$ and the shutter speed data $T_V$ on the margin area of the photographed frame of the photographic film. When a set of $A_V$-representative-character data including five numerical components is set in the first recording-format $A_V$-MAT, this represents an item corresponding to a stop value data to be recorded on the margin area of the photographed frame. Similarly, when a set of $T_V$-representative-character data including six numerical components is set in the second recording-format $T_V$-MAT, this represents an item corresponding to a shutter speed value data to be recorded on the margin area of the photographed frame.

As shown in TABLE I of FIG. 16, each of the numerical components (n/c) represents a character (cha.). Namely, the numerical components "0" to "10" represents numeral characters "0" to "10", and numerical components "10" to "20" represents various characters "F", ".", "/", "+", "−", "±", "E", "v", """, "(blank)" and "r". Thus, for example, when a set of numerical data (10, 5, 11, 6, 19) set in the format $A_V$-MAT, this represents an item "F5.6", and, when a set of numerical data (19, 16, 20, 20, 19) is set in the format $A_V$-MAT, this represents an item "Err". Similarly, when a set of numerical data (1, 12, 1, 0, 0, 0) is set in the format $T_V$-MAT, this represents an item "1/1000", and, when a set of numerical data (19, 19, 16, 20, 20, 19) is set in the format $T_V$-MAT, this represents an item "Err". Note, TABLE I is stored as a one-dimensional map in the EEPROM 23.

In this embodiment, as shown in TABLE II of FIG. 17, the stop value data $A_V$ includes eleven discrete values 9 4/8, 10 4/8, 11 4/8, . . . , 17 4/8, 18 4/8 and 19 4/8, corresponding to F-numbers ($F_{no}$) F1.4, F2.0, F2.8, . . . , F22, F32 and F45, respectively. In TABLE II, "$A_V$D" represents a hexadecimal numerical value corresponding to 8×$A_V$. For example, a hexadecimal numerical value "4C" corresponds to a decimal numerical value "76=8×(9 4/8)", and a hexadecimal numerical value "54" corresponds to a decimal numerical value "84=8×(10 4/8)". In order to represent the eleven discrete stop values by consecutive numbers "0" to "10" ($A_V$No), the following calculation is executed.

$$A_VNo=(A_VDH-4CH)/8H$$

Note that, a character "H" represents that "$A_V$D", "4C" and "8" are based on the hexadecimal notation.

As is apparent from TABLE II, each of the consecutive numbers ($A_V$No) corresponds to a set of $A_V$-representative-character data. Namely, the consecutive numbers "0" to "10" represents the eleven sets of $A_V$-character data, respectively. A one-dimensional map is formed on the basis of both the "$A_V$No" column and the "$A_V$-character data" column, and is stored in the EEPROM 23.

Also, as shown in TABLE III of FIG. 18, the shutter speed value data $T_V$ includes discrete thirteen values 6 4/8, 7 4/8, 8 4/8, . . . , 16 4/8, 17 4/8 and 18 4/8, which correspond to shutter speed values 4", 2", 1", . . . , 1/250, 1/500 and 1/1000, respectively. Similar to the aforementioned case, in TABLE III, "$T_V$D" represents a hexadecimal numerical value corresponding to 8×$T_V$. In order to represent the thirteen discrete values by consecutive numbers "–2" to "10" ($T_V$No), the following calculation is executed.

$$T_V No=(T_V DH-44H)/8H$$

As is apparent from TABLE III, each of the consecutive numbers corresponds to a set of $T_V$-representative-character data. Namely, the consecutive numbers "–2" to "10" represent the thirteen sets of $T_V$-character data, respectively. A one-dimensional map is formed on the basis of both the "$T_V$No" column and the "$T_V$-character data" column, and is stored in the EEPROM 23.

With reference to FIGS. 14 and 15, the character-data-production subroutine is now explained below.

At step S301, it is determined whether the $A_V$-error flag F1 is "1". If F1=1, i.e. if there is a non-coincidence between the counted number of slit-passage-pulses and the stored pulse-number data PND ($A_V$), the control proceeds to step S302, in which the aforesaid set of $A_V$-representative-character data (19, 16, 20, 20, 19), representing the item "Err", is set in the first recording-format $A_V$-MAT.

At step S301, if F1≠1, i.e. if there is a coincidence between the counted number of slit-passage-pulses and the stored pulse-number data PND ($A_V$), the control proceeds to step S303, in which the following calculation is executed:

$$A_V No \leftarrow (A_V DH-4CH)/8H$$

Then, it is determined which number is obtained from among the consecutive numbers "0" to "9" by the calculation (S304, S306, S308, . . . , S318, S320 and S322), and a set of $A_V$-representative-character data, corresponding to the obtained number ($A_V$No), is set in the format $A_V$-MAT (S305, S307, S309, . . . , S319, S321 and S323). For example, if $A_V$No=4 (S312), the aforesaid set of character data (10, 5, 11, 6, 19), representing the item "F5.6", is set in the format $A_V$-MAT. If the obtained number ($A_V$No) is "10", a set of character data (10, 4, 5, 19, 19), representing an item "F45", is set in the format $A_V$-MAT (S324).

Note that, the set format $A_V$-MAT is stored as an $A_V$-item data, to be recorded on the margin area of the photographed frame, in the EEPROM 23.

At step S325, it is determined whether the $T_V$-error flag F2 is "1". If F2=1, i.e. if there is a non-coincidence between the counted shutter-open time and the stored shutter speed data $T_V$, the control proceeds to step S326, in which the aforesaid set of $T_V$-representative-character data (19, 19, 16, 20, 20, 19), representing the item "Err", is set in the second recording-format $T_V$-MAT.

At step S325, if F1≠1, i.e. if there is a coincidence between the counted shutter-open time and the stored shutter speed data $T_V$, the control proceeds to step S327, in which the following calculation is executed:

$$T_V No \leftarrow (T_V DH-44H)/8H$$

Then, it is determined which number is obtained from among the consecutive numbers "–2" to "9" by the calculation (S328, S330, S332, . . . , S346, S348 and S350), and a set of $T_V$-representative-character data, corresponding to the obtained number ($T_V$No), is set in the format $T_V$-MAT (S329, S331, S333, . . . , S347, S349 and S351). For example, if $T_V$No=–1 (S330), a set of character data (19, 19, 19, 2, 18, 19), representing an item "2"", is set in the format $T_V$-MAT. If the obtained number ($T_V$No) is "10", the aforesaid set of character data (1, 12, 1, 0, 0, 0), representing the item "1/1000", is set in the format $T_V$-MAT (S352).

Note that, the set format $T_V$-MAT is stored as a $T_V$-item data, to be recorded on the margin area of the photographed frame, in the EEPROM 23.

Figure 19:
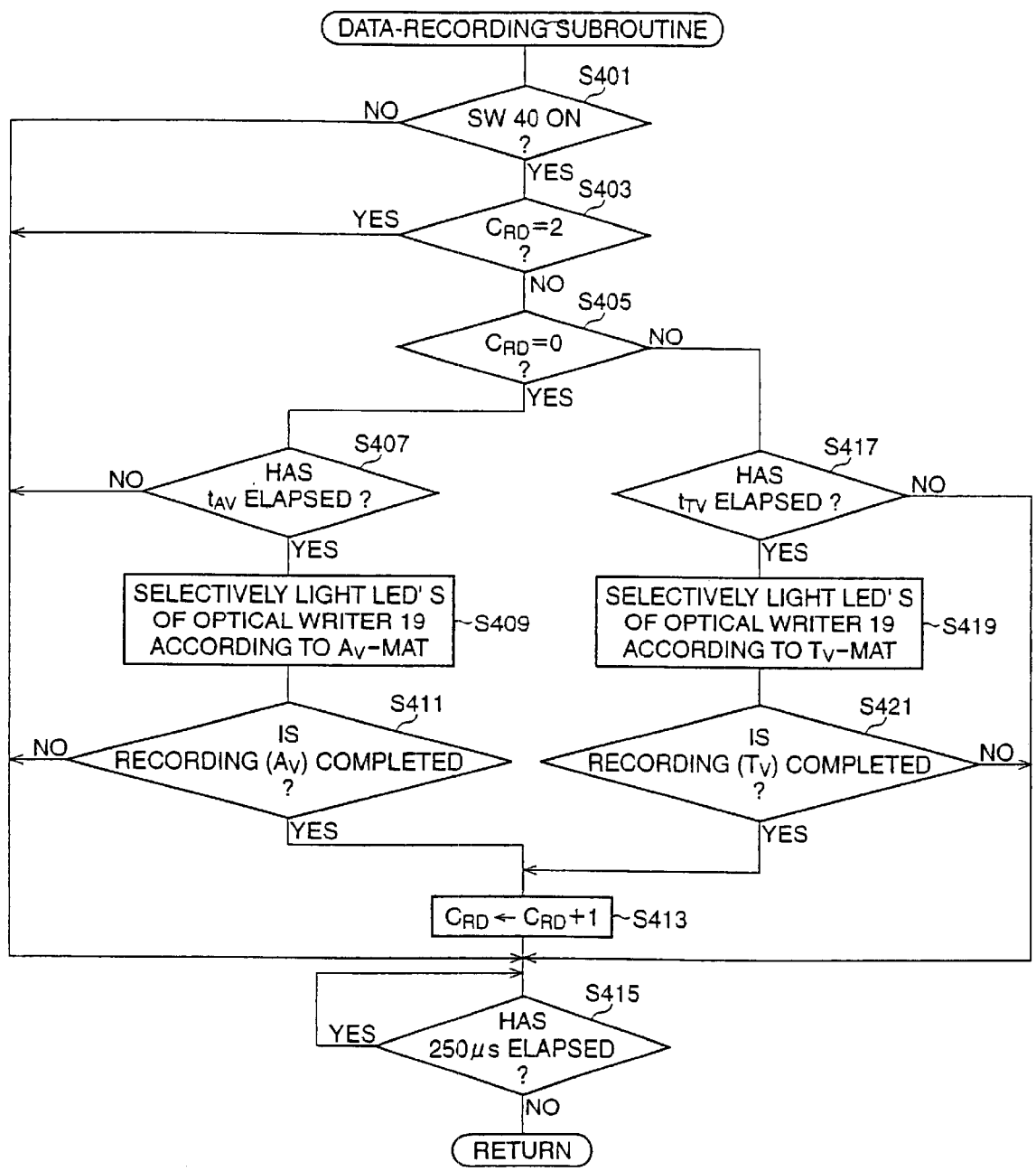
FIG. 19 is a flowchart of data-recording subroutine forming a part of the one-frame-winding subroutine.

FIG. 19 is a flowchart of the data-recording subroutine executed in step S221 of the one-frame-winding subroutine (FIGS. 12 and 13).

At step S401, it is determined whether the recording-mode-selection switch 40 is turned ON, i.e. whether the recording mode is selected. When the recording-mode-selection switch is in an OFF-state, i.e. when the recording-mode is not selected, the control skips to step S415, in which it is determined whether the time of 250 μs has elapsed. When it is confirmed that the time of 250 μs has elapsed, the control returns to step S211 of the one-frame-winding routine (FIGS. 12 and 13). However, there is no progress in the execution of the data-recording subroutine as long as the recording-mode-selection switch 40 is in the OFF-state.

At step S401, when the recording-mode is selected, the control proceeds to step S403, in which it is determined whether a count number of the recording counter $C_{RD}$ is "2". At the initial stage, since $C_{RD}$=0 (S201), the control proceeds to step S405, in which it is determined whether the count number of the recording counter $C_{RD}$ is "0". Of course, at this stage, the control proceeds to step S407 due to $C_{RD}$=0.

At step 407, it is determined whether a time of $t_{AV}$ has elapsed. When the time of $t_{AV}$ has not elapsed, the control skips to step S415, and then returns to step S211 of the one-frame-winding routine after 250 μs. Namely, there is no progress until the time of $t_{AV}$ has elapsed. When it is confirmed that the time of $t_{AV}$ has elapsed, the control proceeds to step S409, in which the seven light-emitting diodes (LED) of the optical writer 19 are selectively lit in accordance with the first recording-format $A_V$-MAT or $A_V$-item data, whereby a part of the $A_V$-item data is recorded on the margin area of the photographed frame. In short, the time of $t_{AV}$ is set to control a location on the margin area of the photographed frame, at which the recording of the $A_V$-item data should be commenced.

At step S411, it is determined whether the recording of the $A_V$-item data has been completed. When the recording of the $A_V$-item data has still not been completed, the control proceeds to step S415, and then returns to step S211 of the one-frame-winding routine after 250 μs. Namely, the partial recording of the $A_V$-item data (S409) is repeated every 250 μs until the recording of the $A_V$-item data is completed. When the completion of the recording of the $A_V$-item data is confirmed, the control proceeds to step S413, in which the count number of the recording-counter $C_{RD}$ is incremented by "1".

After the completion of the recording of the $A_V$-item data, the control proceeds from step S405 to step S417 ($C_{RD}$=1), in which it is determined whether a time of $t_{TV}$ has elapsed.

When the time of $t_{TV}$ has not elapsed, the control skips to step S415, and then returns to step S211 of the one-frame-winding routine after 250 μs. Namely, there is no progress until the time of $t_{TV}$ has elapsed. When it is confirmed that the time of $t_{AV}$ has elapsed, the control proceeds to step S419, in which the seven light-emitting diodes (LED) of the optical writer 19 are selectively lit in accordance with the second recording-format $T_V$-MAT or $T_V$-item data, whereby a part of the $T_V$-item data is recorded on the margin area of the photographed frame. In short, the time of $t_{TV}$ is set to control a location on the margin area of the photographed frame, at which the recording of the $T_V$-item data should be commenced.

At step S421, it is determined whether the recording of the $T_V$-item data has been completed. When the recording of the $T_V$-item data has still not been completed, the control proceeds to step S415, and then returns to step S211 of the one-frame-winding routine after 250 μs. Namely, the partial recording of the $T_V$-item data (S419) is repeated every 250 μs until the recording of the $T_V$-item data is completed. When the completion of the recording of the $T_V$-item data is confirmed, the control proceeds to step S413, in which the count number of the recording-counter $C_{RD}$ is further incremented by "1".

After the completion of the recording of the $T_V$-item data, the control proceeds from step S403 to step S415 ($C_{RD}$=2), and then to step S211 of the one-frame-winding routine after 250 μs. Thereafter, there is no progress in the execution of the data-recording subroutine until the count number of the counter $C_{EG}$ has reached "48" (S219). Namely, the control cannot pass through the data-recording subroutine until the count number of the counter $C_{EG}$ has reached "48" (S219).

Although the above-mentioned embodiment is explained on condition that the automatic exposure mode is selected by the exposure mode selection switch 43, the same is true for the manual exposure mode except that a shutter speed value and a stop value are manually selected and set. In the manual exposure mode, the manually-set shutter speed value and stop value are retrieved by the system control circuit 11, and are then stored as a shutter speed value data $T_V$ and a stop value data $A_V$ in the EEPROM 23.

Finally, it will be understood by those skilled in the art that the foregoing description is of preferred embodiments of the system, and that various changes and modifications may be made to the present invention without departing from the spirit and scope thereof.

The present disclosure relates to subject matters contained in Japanese Patent Applications No. 11-286408 (filed on Oct. 7, 1999) which is expressly incorporated herein, by reference, in its entirety.

What is claimed is:

1. A camera comprising:
   a setter that sets a photographic factor data representing a proper exposure;
   a measurer that measures actual photographic factor data, related to the set photographic factor data, during a photographing operation;
   a determiner that determines whether there is a coincidence between the set photographic factor data and the actual photographic factor data; and
   a recorder that records said actual photographic factor data on a photographed frame of a photographic film when it is determined by said determiner that there is the coincidence between the set photographic factor data and the actual photographic factor data,
   wherein said recorded is configured such that an error message data is recorded on the photographed frame of said photographic film when it is determined by said determiner that there is a non-coincidence between the set photographic factor data and the actual photographic factor data.

2. The camera as set forth in claim 1, wherein said recorder is further configured such that said error message data is recorded on the photographed frame of said photographic film as a substitute for the actual photographic factor data when it is determined by the determiner that there is the non-coincidence between the set photographic factor data and the actual photographic factor data.

3. The camera as set forth in claim 1, further comprising:
   a winder that winds said photographing film from a film cartridge by a length corresponding to one frame after the photographing operation; and
   a memory that stores the set photographic factor data and the actual photographic factor data, said memory further storing said error message data when it is determined by said determiner there is the non-coincidence between the set photographic factor data and the actual photographic data,
   wherein said recorder is configured such that said error message data is read from said memory, and is recorded on the photographed frame of said photographic film during the winding of the one frame length of said photographic film by said winder, when it is determined by said determiner there is the non-coincidence between the set photographic factor data and the actual photographic data.

4. The camera as set forth in claim 1, wherein said photographic factor data is a stop value data, said setter is configured to set a proper stop value data, and said measurer is configured to measure an actual stop value data during the photographing operation.

5. The camera as set forth in claim 1, wherein said photographic factor data is a shutter speed value data, said setter is configured to set a proper shutter speed value data, and said measurer is configured to measure an actual shutter speed value data during the photographing operation.

6. The camera as set forth in claim 1, wherein said setter comprises:
   an exposure mode selector that selects one of an automatic exposure mode and a manual exposure mode;
   a photometry detector that detects a brightness value data from an object to be photographed;
   a photographic factor calculator that calculates said photographic factor data representing the proper exposure from the brightness value data detected by said photometry detector, when said automatic exposure mode is selected by said exposure mode selector; and
   a manual setter that manually sets said photographic factor data representing the proper exposure, when said manual exposure mode is selected by said exposure mode selector.

7. A camera comprising:
   a first setter that sets first photographic factor data representing a proper exposure;
   a second setter that sets second photographic factor data representing said proper exposure;
   a first measurer that measures first actual photographic factor data, corresponding to the set first photographic factor data, during a photographing operation;
   a second measurer that measure second actual photographic factor data, corresponding to the set second photographic factor data, during said photographic operation;

a first determiner that determines whether there is a coincidence between the first set photographic factor data and the first actual photographic factor data; and a second determiner that determines whether there is a coincidence between the second set photographic factor data and the second actual photographic factor data; and a recorder that records said first actual photographic factor data and said second actual photographic factor data on a photographed frame of a photographic film, when it is determined by said first determiner that there is the coincidence between the first set photographic factor data and the first actual photographic factor data, and when it is determined by said second determiner that there is the coincidence between the second set photographic factor data and the second actual photographic factor data, wherein said recorder is configured such that a first error message data is recorded on the photographed frame of said photographic film as a substitute for said first actual photographic factor data when it is determined by said first determiner that there is a non-coincidence between the first set photographic factor data and the first actual photographic factor data, and such that a second error message data is recorded on the photographed frame of said photographic film as a substitute for said second actual photographic factor data when it is determined by said second determiner that there is a non-coincidence between the second set photographic factor data and the second actual photographic factor data, thereby determining whether an improper-exposure occurrence is related to said non-coincidence between the first set photographic factor data and the first actual photographic factor data or to said non-coincidence between the second set of photographic factor data and the second actual photographic factor data.

* * * * *